(12) United States Patent
Chae et al.

(10) Patent No.: US 11,723,068 B2
(45) Date of Patent: Aug. 8, 2023

(54) METHOD FOR TERMINAL TO TRANSMIT AND RECEIVE SIDELINK SIGNAL IN WIRELESS COMMUNICATION SYSTEM SUPPORTING SIDELINK, AND DEVICE FOR SAME

(71) Applicant: LG ELECTRONICS INC., Seoul (KR)

(72) Inventors: Hyukjin Chae, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 8 days.

(21) Appl. No.: 17/058,648

(22) PCT Filed: May 27, 2019

(86) PCT No.: PCT/KR2019/006325
§ 371 (c)(1),
(2) Date: Nov. 24, 2020

(87) PCT Pub. No.: WO2019/226029
PCT Pub. Date: Nov. 28, 2019

(65) Prior Publication Data
US 2021/0212117 A1    Jul. 8, 2021

(30) Foreign Application Priority Data

May 25, 2018   (KR) .................. 10-2018-0059881

(51) Int. Cl.
*H04W 74/08* (2009.01)
*H04W 72/04* (2023.01)
(52) U.S. Cl.
CPC ....... *H04W 74/0808* (2013.01); *H04W 72/04* (2013.01)

(58) Field of Classification Search
None
See application file for complete search history.

(56) References Cited

U.S. PATENT DOCUMENTS

2015/0271786 A1   9/2015  Xue et al.
2018/0167976 A1*  6/2018  Wentink ............ H04W 74/0841
(Continued)

FOREIGN PATENT DOCUMENTS

EP         3121084 A2 *  1/2017  ............ B60W 10/06
WO   WO-2016072908 A1 *  5/2016  ............ H04W 74/08
WO         2018027528     2/2018

OTHER PUBLICATIONS

PCT International Application No. PCT/KR2019/006325, International Search Report dated Sep. 11, 2019, 19 pages.

(Continued)

*Primary Examiner* — Rebecca E Song
(74) *Attorney, Agent, or Firm* — Lee Hong Degerman Kang Waimey

(57) ABSTRACT

Disclosed are: a method for a terminal to transmit a sidelink signal in a wireless communication system that supports sidelink according to various embodiments; and a device for same. Disclosed are a method for a terminal to transmit a sidelink signal and a device for same, the method including: a step for determining a plurality of candidate resources on the basis of reserved resources sensed in a predetermined resource pool and the reception intensities of received signals; a step for determining, on the basis of the attributes of a sidelink signal or the attributes of packets included in the sidelink signal, whether to perform additional carrier sensing for selecting a transmission resource from among the plurality of candidate resources; a step in which if the carrier sensing is performed, the transmission resource is selected after performing the carrier sensing on the plurality (Continued)

of candidate resources until a prescribed timing; and a step in which the sidelink signal is transmitted from the selected transmission resource.

8 Claims, 25 Drawing Sheets

(56) References Cited

U.S. PATENT DOCUMENTS

2018/0198726 A1\* 7/2018 Baron ................... H04L 47/626
2022/0086805 A1\* 3/2022 Zhang ................... H04W 72/02

OTHER PUBLICATIONS

Sony, "Discussion on carrier aggregation in sidelink mode 4 operation," 3GPP TSG RAN WG1 Meeting 91, R1-1720471, Dec. 2017, 6 pages.
Lenovo, "Resource pool for V2V," 3GPP TSG RAN WG1 Meeting #84bis, R1-162734, Apr. 2016, 6 pages.
CATT, "Measurement metric for the congestion level in LTE V2X," 3GPP TSG RAN WG1 Meeting #86bis, R1-1608720, Oct. 2016, 8 pages.

\* cited by examiner (a)

(b)

(a)

(b)

METHOD FOR TERMINAL TO TRANSMIT AND RECEIVE SIDELINK SIGNAL IN WIRELESS COMMUNICATION SYSTEM SUPPORTING SIDELINK, AND DEVICE FOR SAME

CROSS-REFERENCE TO RELATED APPLICATIONS

This application is the National Stage filing under 35 U.S.C. 371 of International Application No. PCT/KR2019/006325, filed on May 27, 2019, which claims the benefit of earlier filing date and right of priority to Korean Application No. 10-2018-0059881, filed on May 25, 2018, the contents of which are all hereby incorporated by reference herein in their entirety.

TECHNICAL FIELD

The present disclosure relates a method and apparatus for transmitting and receiving a sidelink signal by a user equipment (UE) in a wireless communication system supporting sidelink and, more particularly, to a method of transmitting and receiving a sidelink signal by the UE on a transmission resource selected based on an attribute of the sidelink signal or an attribute of a packet, and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DETAILED DESCRIPTION OF THE DISCLOSURE

Technical Problems

An object of the present disclosure is to provide a method of transmitting a sidelink signal on a transmission resource suitable for priority, reliability, and a latency requirement demanded for a packet by determining whether to perform additional carrier sensing according to an attribute or type of the packet included in the sidelink signal.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

According to an aspect of the present disclosure, provided herein is a method of transmitting a sidelink signal by a user equipment (UE) in a wireless communication system supporting sidelink, including determining a plurality of candidate resources based on reserved resources sensed from a predetermined resource pool and a received strength of a received signal, determining whether to perform additional carrier sensing for selecting a transmission resource from among the plural candidate resources, based on an attribute of the sidelink signal or an attribute of a packet included in the sidelink signal, selecting the transmission resource after performing the carrier sensing for the plural candidate resources until a predetermined timing, based on performing the carrier sensing, and transmitting the sidelink signal on the selected transmission resource.

The attribute of the packet may be at least one of periodicity of the packet, priority of the packet, or a latency requirement and reliability demanded for the packet.

Whether to perform the carrier sensing may be determined based on a result of comparing a preset threshold time with a time from a specific timing to a timing at which latency of transmission of the packet according to the latency requirement is permitted.

The predetermined timing may be determined based on a timing at which latency of transmission of the packet according to the latency requirement of the packet is permitted.

The predetermined timing may be determined based on a timing at which a backoff timer which is decreased upon sensing a received strength less than a preset threshold reaches a predetermined value.

Based on non-performing the carrier sensing, the transmission resource may be randomly selected from among resources having received strengths less than a preset threshold among the plural candidate resources.

The predetermined resource pool may be determined according to the attribute of the sidelink signal or the attribute of the packet among a plurality of resource pools.

The plural resource pools may include a first resource pool in which only selection of the transmission resource is permitted according to performing the carrier sensing and a second resource pool in which only random selection of the transmission resource is permitted without performing carrier sensing.

The plural resource pools may further include a third resource pool in which selection of the transmission resource according to performing the carrier sensing or random selection of the transmission resource without performing the carrier sensing is permitted.

Based on non-demand for periodic transmission of the packet, the transmission resource may be selected after the carrier sensing is performed until the predetermined timing, and based on demand for periodic transmission of the packet, the transmission resource may be randomly selected from among the plural candidate resources without performing the carrier sensing.

Based on priority of the packet equal to or higher than a preset threshold, the transmission resource may be selected after the carrier sensing is performed until the predetermined timing, and based on priority of the packet lower than the preset threshold, the transmission resource may be randomly selected from among the plural candidate resources without performing the carrier sensing.

Based on a latency requirement for the packet less than a preset latency time, the transmission resource may be selected after the carrier sensing is performed until the predetermined timing, and based on a latency requirement for the packet equal to or greater than the preset latency time, the transmission resource may be randomly selected from among the plural candidate resources without performing the carrier sensing.

The attribute of the sidelink signal may be at least one of a level of a modulation and coding scheme (MCS), a size of a message included in the sidelink signal, or a variation degree of the size of the message.

The backoff counter may have a count value determined within a preset range based on at least one of priority, reliability, or latency requirement of the packet.

In another aspect of the present disclosure, provided herein is an apparatus for transmitting a sidelink signal in a wireless communication system supporting sidelink, including a processor, and a memory connected to the processor. The processor is configured to determine a plurality of candidate resources based on reserved resources sensed from a predetermined resource pool and a received strength of a received signal, determine whether to perform additional carrier sensing for selecting a transmission resource from among the plural candidate resources, based on an attribute of the sidelink signal or an attribute of a packet included in the sidelink signal, select the transmission resource after performing the carrier sensing for the plural candidate resources until a predetermined timing, based on performing the carrier sensing, and generate the sidelink signal to be transmitted on the selected transmission resource.

The processor may switch a traveling mode of the apparatus from an autonomous traveling mode to a manual traveling mode or from the manual traveling mode to the autonomous traveling mode, based on reception of user input.

Advantageous Effects

According to various embodiments of the present disclosure, whether to perform additional carrier sensing is determined according to an attribute or type of a packet included in a sidelink signal so that the sidelink signal may be transmitted on a transmission resource suitable for priority, reliability, and a latency requirement demanded for the packet.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the present disclosure and are incorporated in and constitute a part of this application, illustrate embodiments of the present disclosure and together with the description serve to explain the principle of the present disclosure. In the drawings.

BEST MODE FOR CARRYING OUT THE DISCLOSURE

Figure 1:
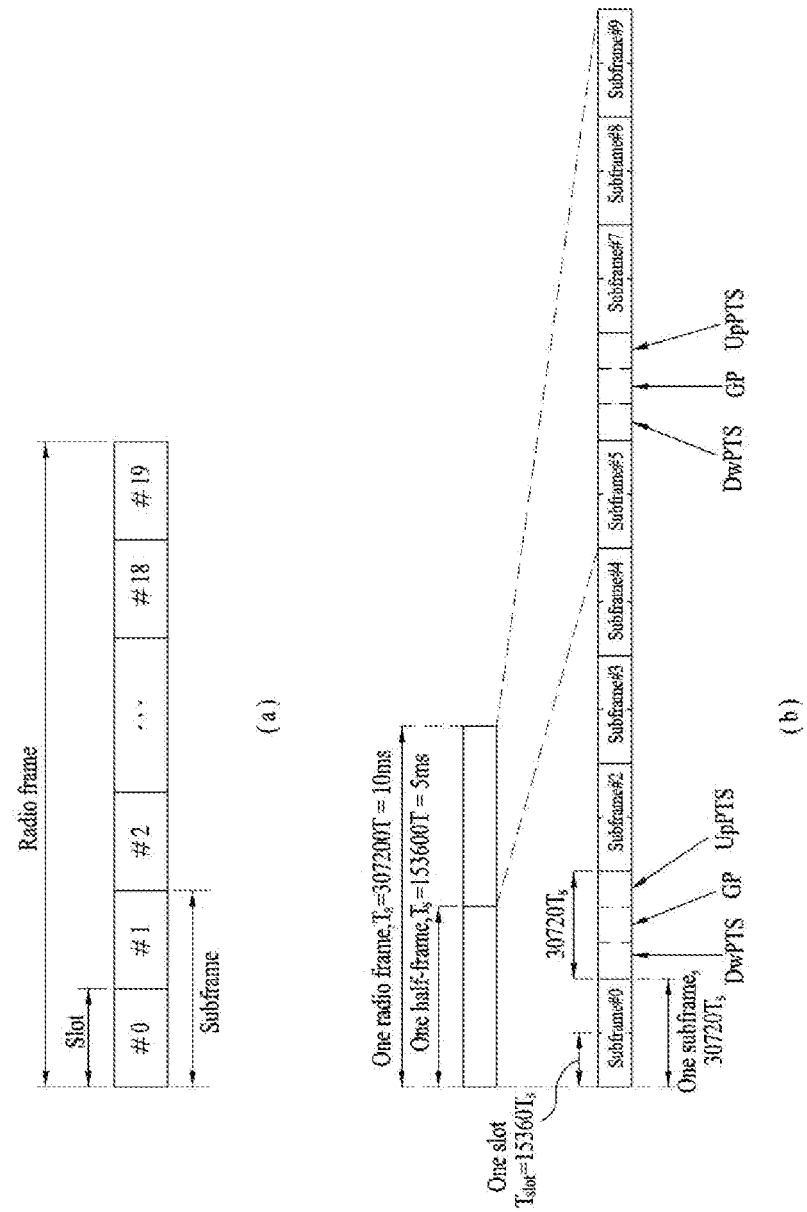
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs 01-DMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency-division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(*a*) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(*b*) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
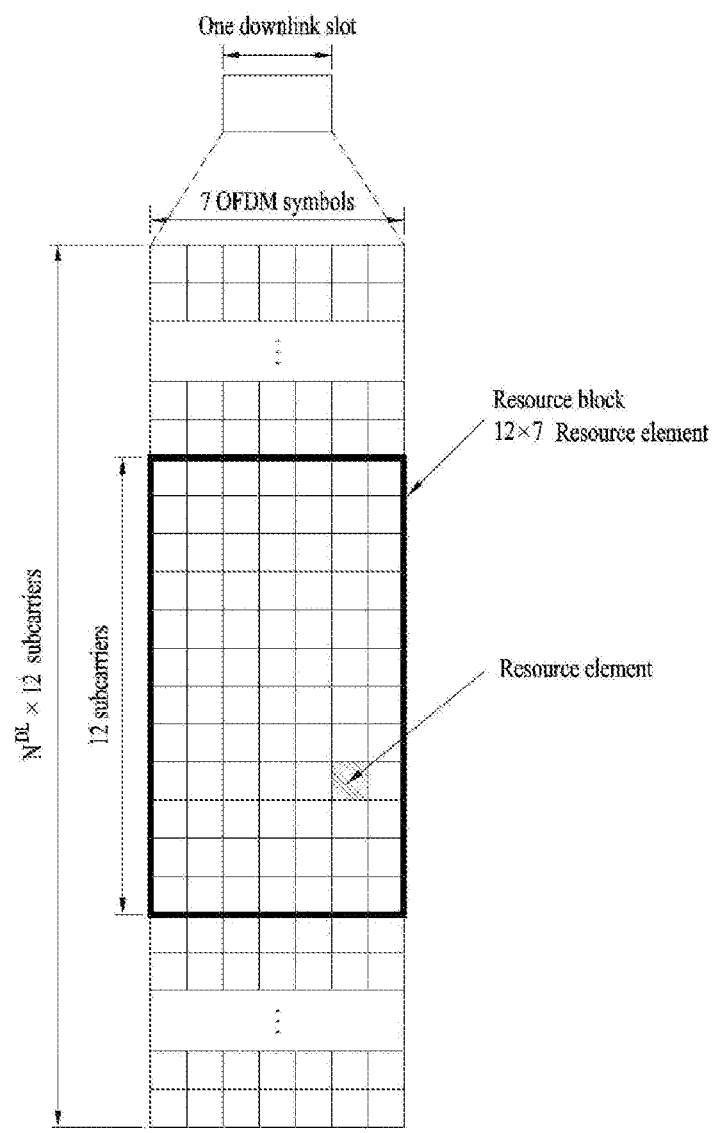
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
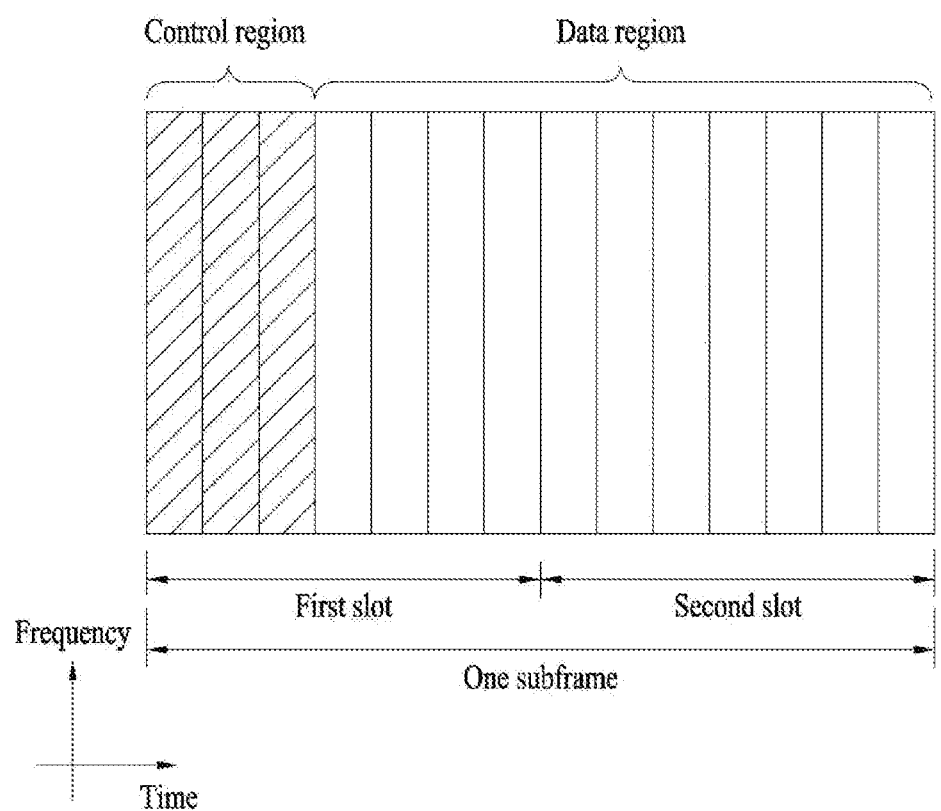
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
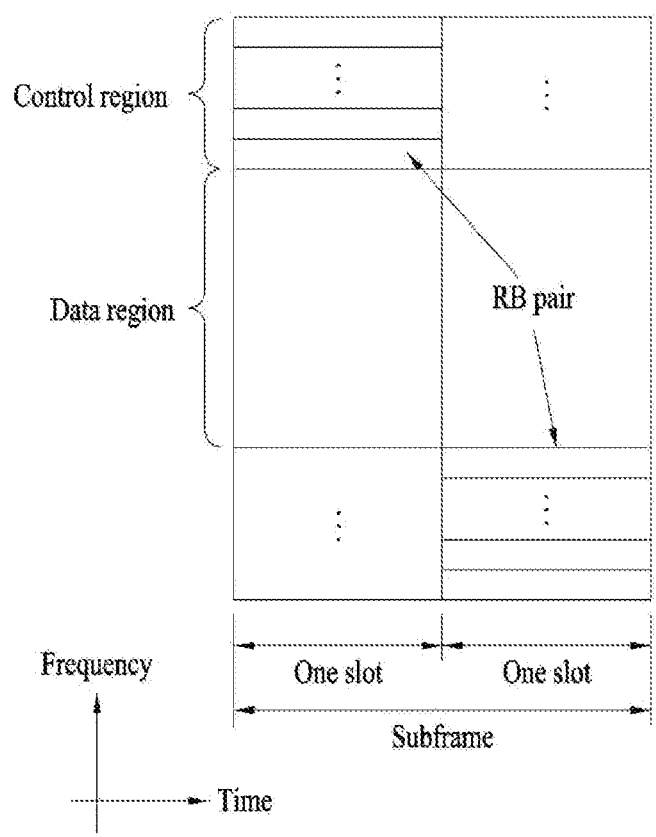
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an uplink channel in a different frequency.

The downlink RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI, when downlink DM-RSs are transmitted;

v) Multimedia broadcast single frequency network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of Multiple-Input Multiple-Output (MIMO) System

Figure 5:
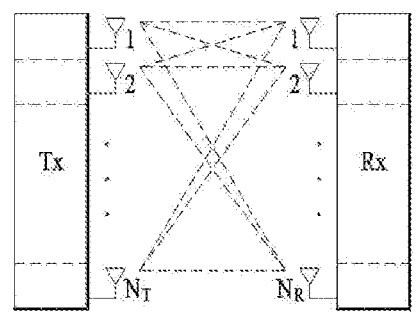
FIG. 5 is a view illustrating the configuration of a wireless communication system having multiple antennas.
Figure 5:
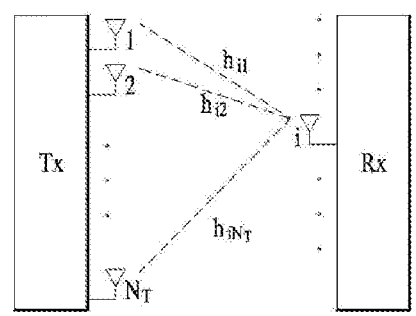

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \qquad \text{[Equation 1]}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s = [s_1, s_2, \ldots, s_{N_T}]^T \qquad \text{[Equation 2]}$$

Meanwhile, transmit powers can be set different from each other for individual pieces of transmission information $s_1, s_2, \ldots, s_{N_T}$ respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

In addition, $\hat{s}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Assuming a case of configuring $N_T$ transmitted signals $x_1, x_2, \ldots, x_{N_T}$, which are actually transmitted, by applying weight matrix w to the information vector $\hat{s}$ having the adjusted transmit powers, the weight matrix w serves to appropriately distribute the transmission information to each antenna according to a transport channel state. $x_1, x_2, \ldots, x_{N_T}$ can be expressed by using the vector x as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Equation 5]}$$

In Equation 5, $w_{ij}$ denotes a weight between an $i^{th}$ Tx antenna and $j^{th}$ information. w is also called a precoding matrix.

If the $N_R$ Rx antennas are present, respective received signals $y_1, y_2, \ldots, y_{N_R}$ of the antennas can be expressed as follows.

$$y = [y_1, y_2, \ldots, y_{N_R}]^T \qquad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T = [h_{i1}, h_{i2}, \ldots, h_{iN_T}] \qquad \text{[Equation 7]}$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \qquad \text{[Equation 8]}$$

An AWGN (Additive White Gaussian Noise) is added to the actual channels after a channel matrix H. The AWGN $n_1, n_2, \ldots, n_{N_R}$ respectively added to the $N_R$ Rx antennas can be expressed as follows.

$$n = [n_1, n_2, \ldots, n_{N_R}]^T \qquad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_i \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n$$ [Equation 10]

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R)$$ [Equation 11]

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
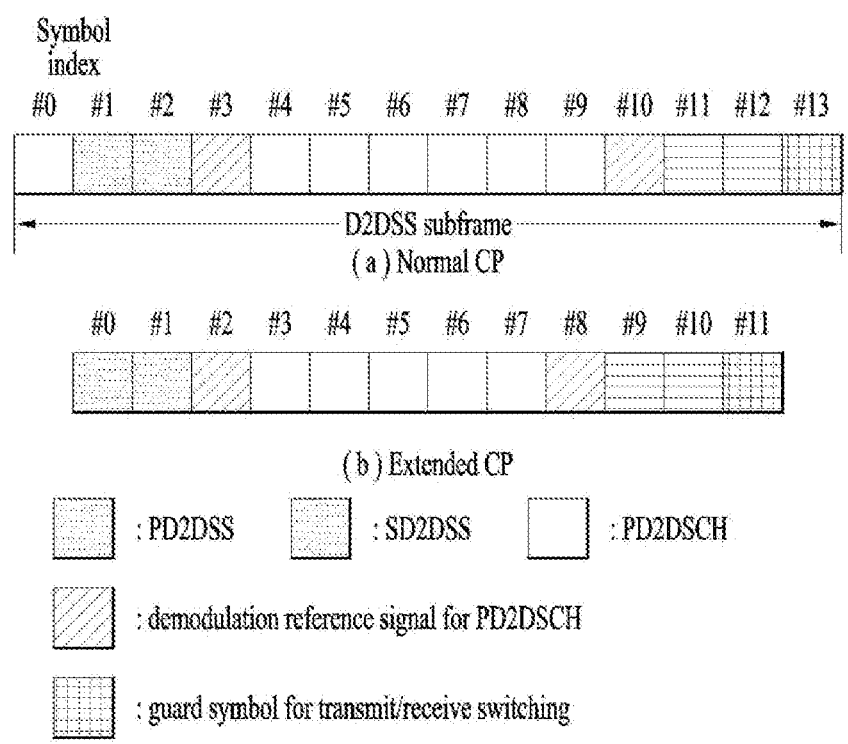
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a downlink (DL) primary synchronization signal (PSS), the PD2DSS may use a different Zadoff-Chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike the DL PSS/SSS (secondary synchronization signal), the PD2DSS/SD2DSS follows an uplink (UL) subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
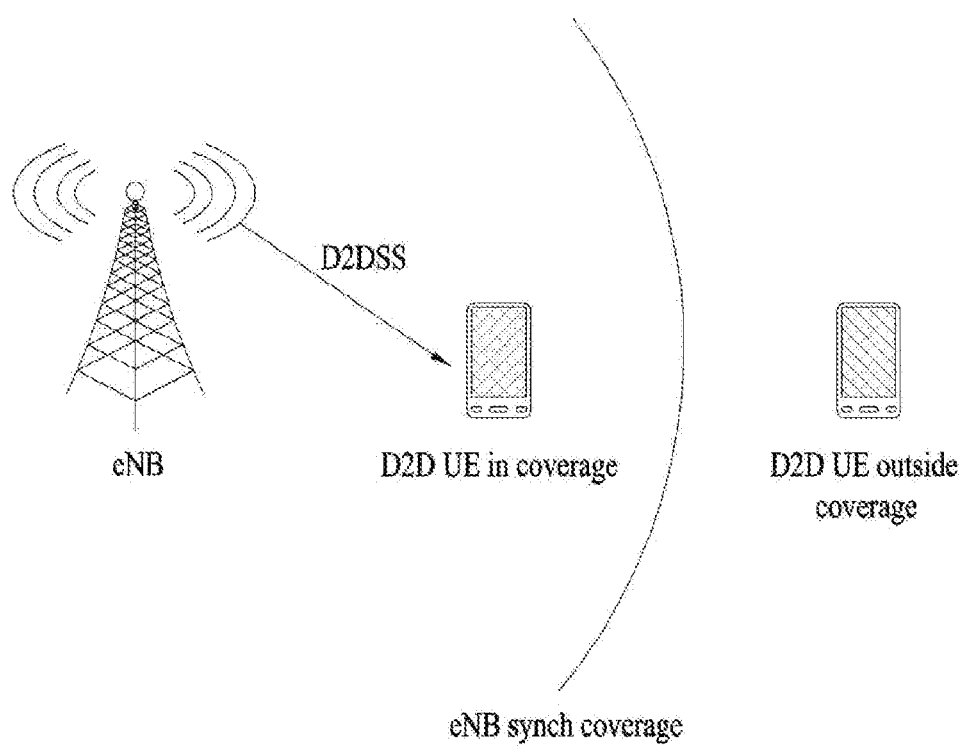
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

Figure 8:
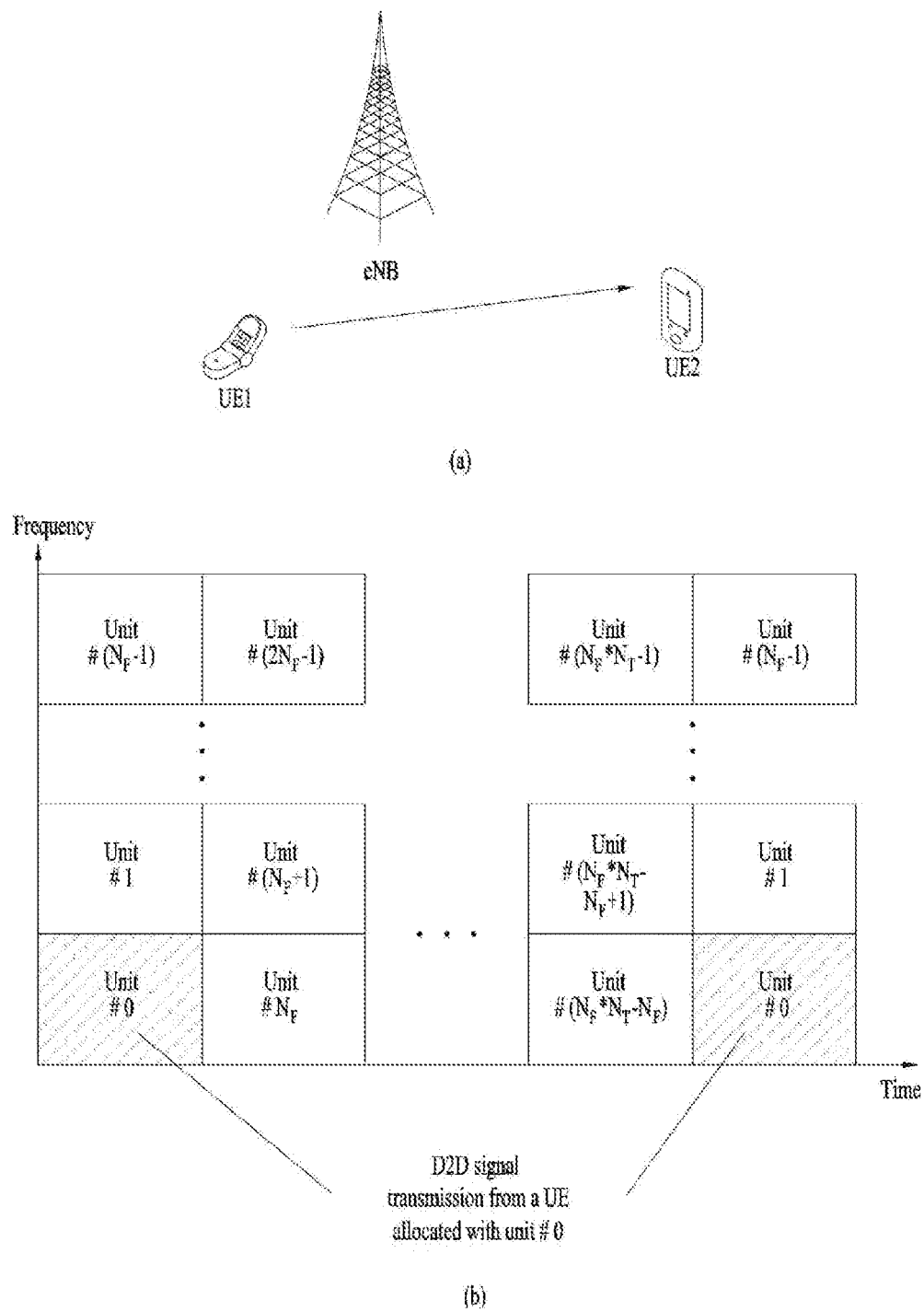
FIG. 8 is a view illustrating an exemplary D2D resource pool for D2D communication.

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(*b*) shows an example of configuring a resource unit. Referring to FIG. 8(*b*), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Despite the same contents, D2D signals may use different resource pools according to the transmission and reception properties of the D2D signals. For example, despite the same D2D data channels or the same discovery messages, they may be distinguished by different resource pools according to transmission timing determination schemes for the D2D signals (e.g., whether a D2D signal is transmitted at the reception time of a synchronization reference signal or at a time resulting from applying a predetermined TA to the reception time of the synchronization reference signal), resource allocation schemes for the D2D signals (e.g., whether an eNB configures the transmission resources of an individual signal for an individual transmitting UE or the individual transmitting UE autonomously selects the transmission resources of an individual signal in a pool), the signal formats of the D2D signals (e.g., the number of symbols occupied by each D2D signal in one subframe or the number of subframes used for transmission of a D2D signal), signal strengths from the eNB, the transmission power of a D2D UE, and so on. In D2D communication, a mode in which an eNB directly indicates transmission resources to a D2D transmitting UE is referred to as sidelink transmission mode 1, and a mode in which a transmission resource area is preconfigured or the eNB configures a transmission resource area and the UE directly selects transmission resources is referred to as sidelink transmission mode 2. In D2D discovery, a mode in which an eNB directly indicates resources is referred to as Type 2, and a mode in which a UE selects transmission resources directly from a preconfigured resource area or a resource area indicated by the eNB is referred to as Type 1.

Figure 9:
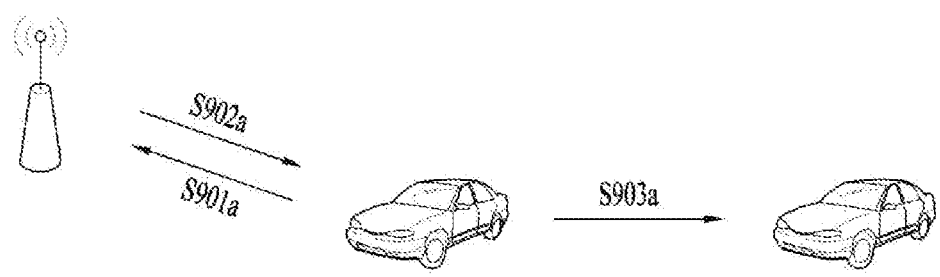
FIG. 9 is a view referred to for describing transmission modes and scheduling schemes for vehicle-to-everything (V2X)
Figure 9:
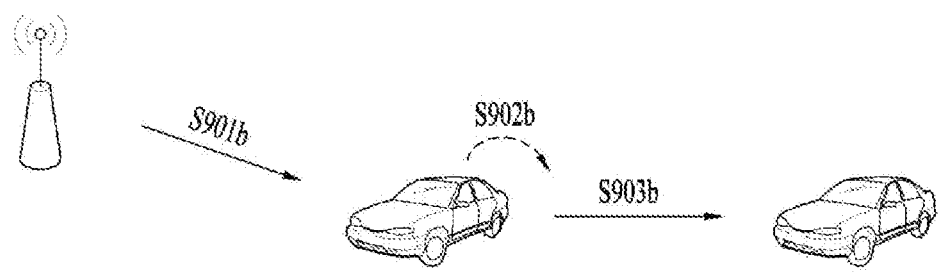
Figure 10:
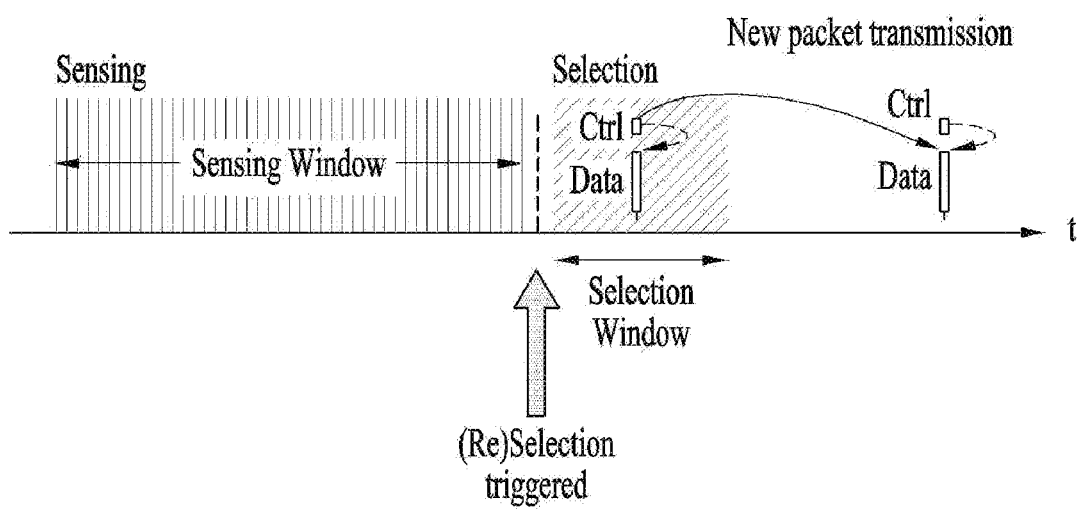
FIG. 10 is a view illustrating a method of selecting resources in V2X.
Figure 11:
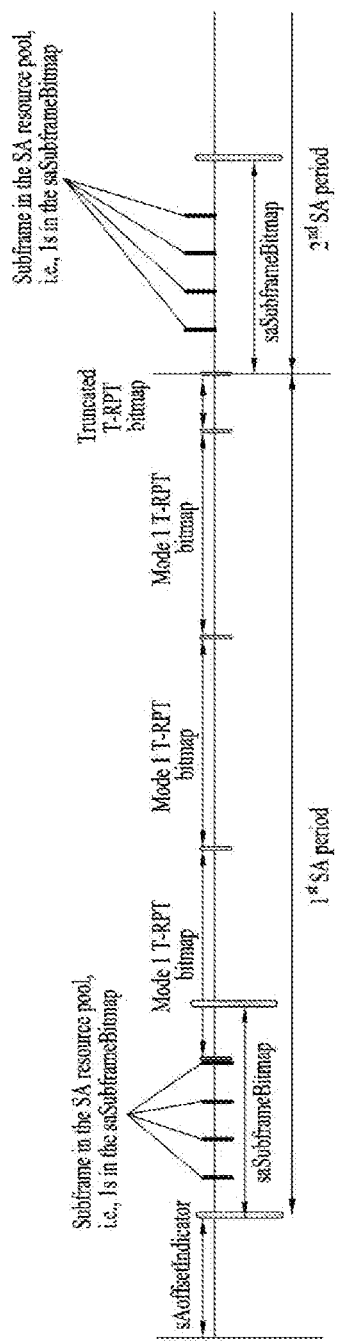
FIG. 11 is a view referred to for describing a scheduling assignment (SA) and data transmission in D2D.

In V2X, sidelink transmission mode 3 based on centralized scheduling and sidelink transmission mode 4 based on distributed scheduling are available. FIG. 9 illustrates scheduling schemes according to these two transmission modes. Referring to FIG. 9, in transmission mode 3 based on centralized scheduling, when a vehicle requests sidelink resources to an eNB (S901*a*), the eNB allocates the resources (S902*a*), and the vehicle transmits a signal in the resources to another vehicle (S903*a*). In the centralized transmission scheme, resources of another carrier may be also scheduled. In distributed scheduling corresponding to transmission mode 4 illustrated in FIG. 9(*b*), a vehicle selects transmission resources (S902*b*), while sensing resources preconfigured by the eNB, that is, a resource pool (S901*b*), and then transmits a signal in the selected resources to another vehicle (S903*b*). When the transmission resources are selected, transmission resources for a next packet are also reserved, as illustrated in FIG. 10. In V2X, each MAC PDU is transmitted twice. When resources for an initial transmission are reserved, resources for a retransmission are also reserved with a time gap from the resources for the initial transmission. For details of the resource reservation, see Section 14 of 3GPP TS 36.213 V14.6.0, which is incorporated herein as background art.

Transmission and Reception of SA

A UE in sidelink transmission mode 1 may transmit a scheduling assignment (SA) (a D2D signal or sidelink control information (SCI)) in resources configured by an eNB. A UE in sidelink transmission mode 2 may be configured with resources for D2D transmission by the eNB, select time and frequency resources from among the configured resources, and transmit an SA in the selected time and frequency resources.

In sidelink transmission mode 1 or 2, an SA period may be defined as illustrated in FIG. 9. Referring to FIG. 9, a first SA period may start in a subframe spaced from a specific system frame by a specific offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA by a subframe bitmap, saSubframeBitmap. The resource pool for D2D data transmission may include subframes determined by a time-resource pattern for transmission (T-RPT) (or a time-resource pattern (TRP)) in mode 1. As illustrated, when the number of subframes included in the SA period except for the SA resource pool is larger than the number of T-RPT bits, the T-RPT may be applied repeatedly, and the last applied T-RPT may be truncated to include as many bits as the number of the remaining subframes. A transmitting UE performs transmission at T-RPT positions corresponding to 1s in a T-RPT bitmap, and one MAC PDU is transmitted four times.

Figure 12:
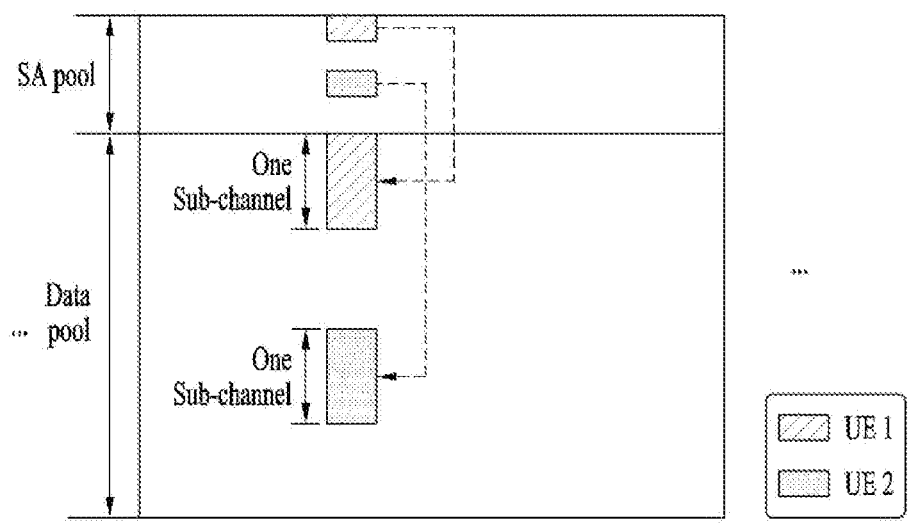
FIG. 12 is a view referred to for describing an SA and data transmission in V2X.
Figure 12:
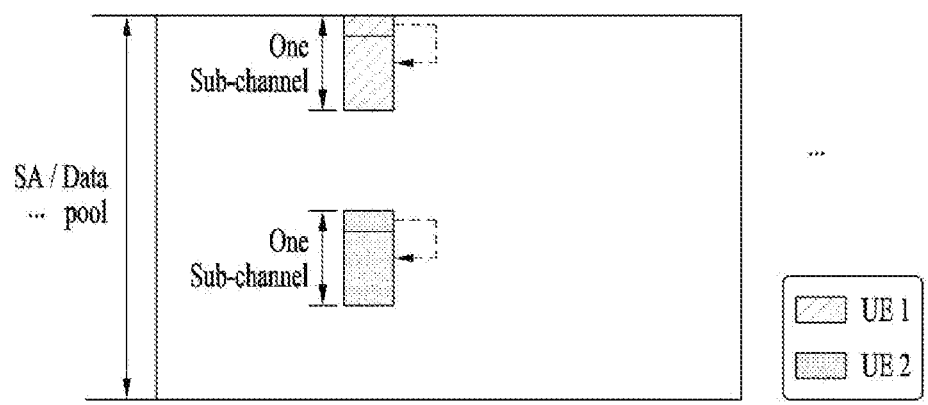

Unlike D2D, an SA (PSCCH) and data (PSSCH) are frequency-division multiplexed (FDM) and transmitted in V2X, that is, sidelink transmission mode 3 or 4. Because latency reduction is a significant factor in V2X in view of the nature of vehicle communication, an SA and data are FDM and transmitted on different frequency resources of the same time resources. Examples of this transmission scheme are illustrated in FIG. 12. An SA and data may not be contiguous to each other as illustrated in FIG. 12(*a*) or may be contiguous to each other as illustrated in FIG. 12(*b*). Herein, a basic transmission unit is a subchannel. A subchannel is a resource unit including one or more RBs on the frequency axis in predetermined time resources (e.g., a subframe). The number of RBs included in a subchannel, that is, the size of the subchannel and the starting position of the subchannel on the frequency axis are indicated by higher-layer signaling.

In V2V communication, a cooperative awareness message (CAM) of a periodic message type, a decentralized environmental notification message (DENM) of an event triggered message type, and so on may be transmitted. The CAM may deliver basic vehicle information including dynamic state information about a vehicle, such as a direction and a speed, static data of the vehicle, such as dimensions, an ambient illumination state, details of a path, and so on. The CAM may be 50 bytes to 300 bytes in length. The CAM is broadcast, and its latency should be shorter than 100 ms. The DENM may be generated, upon occurrence of an unexpected incident such as breakdown or an accident of a vehicle. The DENM may be shorter than 3000 bytes, and received by all vehicles within a transmission range. The DENM may have a higher priority than the CAM. When it is said that a message has a higher priority, this may mean that from the perspective of one UE, in the case of simultaneous transmission of messages, the higher-priority message is transmitted above all things, or earlier in time than any other of the plurality of messages. From the perspective of multiple UEs, a message having a higher priority may be subjected to less interference than a message having a lower priority, to thereby have a reduced reception error probability. Regarding the CAM, the CAM may have a larger message size when it includes security overhead than when it does not.

New Radio Access Technology (New RAT or NR)

As more and more communication devices require a larger communication capacity, there is a need for enhanced mobile broadband communication beyond legacy RAT. In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as NR.

Figure 13:
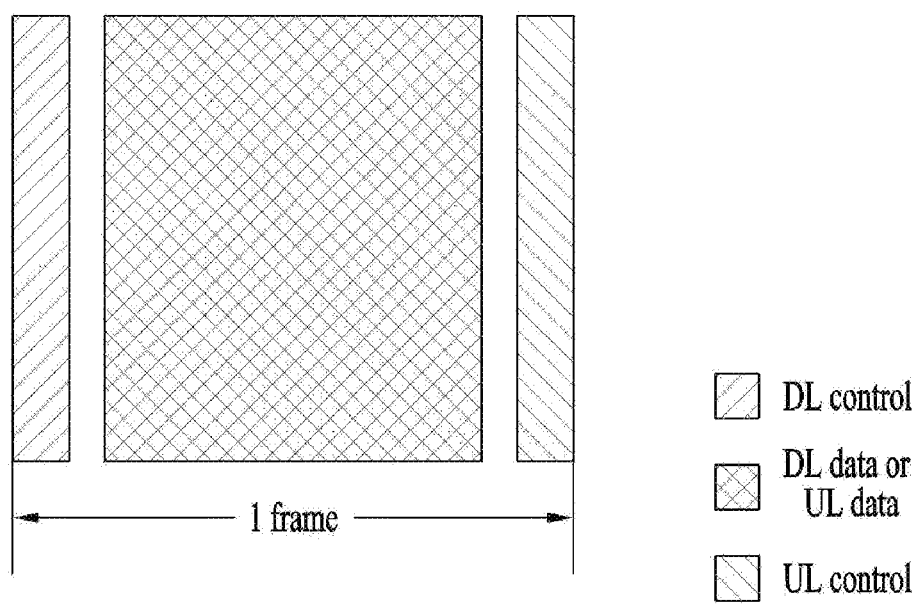
FIGS. 13 and 14 illustrate new radio access technology (NRAT) frame structures.
Figure 14:
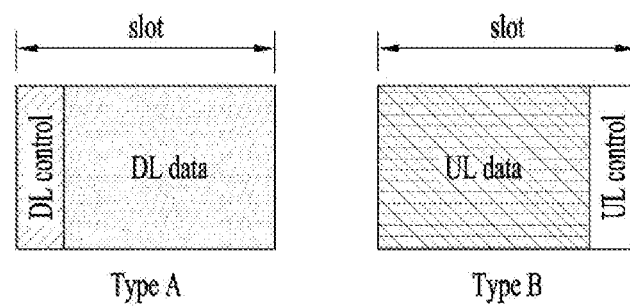
Figure 14:
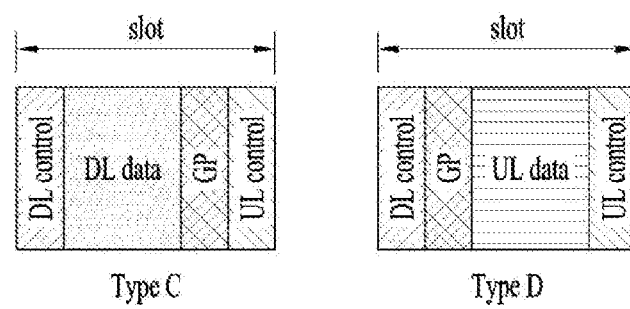

FIGS. 13 and 14 illustrate exemplary frame structures available for NR. Referring to FIG. 13, the frame structure is characterized by a self-contained structure in which all of a DL control channel, DL or UL data, and a UL control channel are included in one frame. The DL control channel may deliver DL data scheduling information, UL data scheduling information, and so on, and the UL control channel may deliver ACK/NACK information for DL data, CSI (modulation and coding scheme (MCS) information, MIMO transmission-related information, and so on), a scheduling request, and so on. A time gap for DL-to-UL or UL-to-DL switching may be defined between a control region and the data region. A part of a DL control channel, DL data, UL data, and a UL control channel may not be configured in one frame. Further, the sequence of channels in one frame may be changed (e.g., DL control/DL data/UL control/UL data, UL control/UL data/DL control/DL data, or the like)

Meanwhile, carrier aggregation may be applied to D2D communication to improve data transfer rates or reliability. For example, upon receiving signals on aggregated carriers, a receiving UE may perform combining or joint-decoding thereon or forward decoded signals to higher layers so as to perform (soft) combining on the signals which are transmitted on the different carriers. For such operation, the receiving UE needs to know which carriers are aggregated, that is, which signals on which carriers the receiving UE needs to combine. Accordingly, the radio resources on the aggregated carriers needs to be informed. In 3GPP Ra. 14 V2X, a transmitting UE directly indicates the location of a time-frequency resource for transmitting data (PSSCH) using a control signal (PSCCH). If the carrier aggregation is indicated by the PSCCH, an additional bit field may be required for the indication. However, the remaining reserved bits of the PSCCH are about 5 to 7 bits, and these bit are insufficient. Hence, a method capable of indicating radio resources on aggregated carriers is required, and details thereof will be described in the following.

Coexistence of LBT based transmission and SPS based transmission

The most fundamental principle of an IEEE 802.11 MAC operation is carrier sense multiple access with collision avoidance (CSMA/CA). According to CSMA/CA, all wireless LAN nodes need to determine whether other UEs have already performed transmission before the nodes transmit packets thereof. That is, the wireless LAN nodes determine whether a wireless channel is already being used or is in an idle state through observation using carrier sense. If it is determined that any other signals are sensed so that a channel is busy, the wireless LAN nodes postpone transmission. The wireless LAN nodes start to perform transmission thereof only when it is determined that the channel is idle. For example, this may be understood as the principle that, in a situation in which many people converse with each other, a person sees if there is someone who has already talked before she/he talks (i.e., listen-before-talk (LBT)) and starts to talk only when all people are quiet without any talker.

However, a problem that no signal is pre-sensed using only such a carrier sensing scheme, for example, that collision occurs when simultaneous transmission of two or more signals is started, cannot be avoided. For this reason, a collision avoidance (CA) scheme is used together with carrier sensing. An entire operation of the CA scheme is as follows.

First, if a node has a packet to be transmitted, the UE determines any integer between a contention window (CW) given as a natural number and 0 and starts to sense a backoff counter (BC)-based carrier.

Next, the UE determines the state of a wireless channel through carrier sensing within a time slot of a predetermined time duration. The UE determines the state of the channel in every time slot. If it is sensed that the channel is idle, the UE decreases (i.e., backs off) the value of the BC by one. If it is sensed that the channel is busy in a corresponding time slot, the UE stops the BC from being decreased and maintains the BC at a current value until the channel becomes idle. Thus, packet transmission is started when the BC finally reaches 0 through carrier sensing during multiple time slots.

Even when the BC is used, if the BC becomes 0 in the same time slot in two or more nodes, packets may start to be simultaneously transmitted and collision may occur therebetween. If the packets fail to be transmitted, a corresponding node should select a new BC value for packet retransmission. In this case, the size of the CW corresponding to a range for selecting the BC is exponentially increased under the assumption that transmission that has failed earlier collides with transmission of another node. This serves to lower a collision probability of the next time by further randomizing a transmission starting time point.

A successful transmission procedure of one packet in terms of a MAC operation of a wireless LAN is summarized as follows. A transmitter performs a backoff operation during an arbitrary time and starts to transmit a packet. After packet transmission is ended, a receiver transmits an acknowledgement (ACK) packet to the transmitter in order to inform the transmitter that the packet has been successfully received. A backoff time and an ACK packet transmission time in one-time packet transmission causes MAC overhead which is inevitably generated in actual data transmission, thereby functioning to restrict the performance or throughput of communication that a user feels.

Referring to "H. Kwon, H. Seo, S. Kim, and B. G. Lee, Generalized CSMA/CA for 01-DMA systems: Protocol design, throughput analysis, and implementation issues, IEEE Transactions on wireless communications, Vol. 8, No. 8, August, 2009", a scheme of applying multi-channel CSMA/CA is disclosed. Although legacy 802.11 MAC considers CSMA with respect to one channel, the scheme describes a method of generalizing CSMA when there are multiple channels. An OFDMA-based multi-channel CSMA protocol proposed in "Generalized CSMA/CA for OFDMA systems: Protocol design, throughput analysis, and implementation issues" is summarized as follows.

First, if a node has a packet to be transmitted, the node determines any integer between a CW given as a natural number and 0 and starts to sense a BC-based carrier. Next, the node decreases the value of a BC by one whenever there is a subchannel which is idle within a time slot of a predetermined time duration. If it is sensed that a specific subchannel is busy, the node stops the BC from being decreased and maintains the BC at a current value until it is sensed that there is an idle subchannel.

Thus, if the BC finally reaches 0 through carrier sensing on multiple channels and in multiple time slots, packet transmission is started. If the BC becomes 0 on the same subchannel in two or more nodes, the nodes simultaneously start to perform transmission and collision occurs therebetween.

If a packet fails to be transmitted as described above, a corresponding node should select a new BC value for transmitting the packet. In this case, the size of the CW corresponding to a range for selecting the BC is exponentially increased under the assumption that transmission that has failed earlier collides with transmission of another node. This serves to lower a collision probability of the next time by further randomizing a transmission starting time point.

In Rel. 14 3GPP V2X, sensing with semi-persistent transmission is used. In this scheme, upon (re)selection of a resource, the UE uses an empty subchannel (which may include N consecutive N RBs among frequency resources and N is configurable by a network) as a transmission resource, based on a result of monitoring the state of a channel for 1000 ms and maintains use of this resource at a predetermined period. This is a transmission scheme devised because a large amount of V2X messages has periodicity. The UE decodes a PSCCH and measures reference signal received power (RSRP) and a received signal strength indicator (RSSI) of each subchannel, thereby filtering subchannels used by other UEs. In other words, the UE may measure the RSRP and RSSI of each subchannel in a preset resource pool and exclude subchannels (or resource blocks) used by other UEs from the resource pool.

In an advanced V2X service, not only a packet with periodicity but also an aperiodic packet in an accidental situation may occur. For this service, sensing schemes with semi-persistent transmission used in 802.11-type CSMA/CA and LTE-based V2X may be needed as effective coexistence schemes.

For effective coexistence of two different media access schemes in one time-frequency resource region, an existing multi-channel CSMA/CA scheme needs to be changed. The present disclosure basically assumes that the UE is synchronized with a sidelink synchronization signal (SLSS) of a global navigation satellite system (GNSS), a gNB, an eNB, or another UE. Accordingly, it is assumed that a timing error between UEs falls within a cyclic prefix (CP). It is also assumed that a resource pool is configured by the network or is preconfigured and that UEs commonly pre-recognize a time and frequency resource region used for D2D communication.

Based on the above assumptions, a modification of the multi-channel CSMA/CA scheme and a coexistence method with a semi-persistent scheduling (SPS) transmission scheme in one resource region will be described hereinbelow in detail.

A specific resource region may be divided into Nt time resource regions and Nf frequency resource regions. The UE may select resources in a candidate resource unit. In this case, one candidate resource may mean a frequency resource of a size to be used for data transmission by the UE and may be expressed as a multiple of an integer of a subchannel. When resource reselection is triggered in an n-th slot, the following operation is proposed.

The UE determines selectable candidate resources up to a maximum time resource that satisfies a latency requirement of a packet to be transmitted. In this case, a timing capable of satisfying the latency requirement may be a candidate resource selectable by all subchannels belonging to slots from slot n+a (where a is an integer smaller than a predetermined threshold and may be predetermined or may differ according to capability of the UE) to slot n+k (where k is an integer larger than a). Additionally, resources preconfigured to be reserved at every predetermined period or resources reserved to be used by other UEs, through SPS, are excluded from the selectable candidate resource.

The UE excludes resources reserved by other UEs according to an operation such as SPS from the selectable candidate resource and splits the remaining resources in the candidate resource unit to be used for transmission thereof. If the size of a desired candidate resource is not secured in one slot, the UE does not select a resource in the corresponding slot. The total number of candidate resources included in slots from n+a to n+k is expressed as M. For convenience of operation, the UE may index the M candidate resources sequentially (in order of time and frequency or in order of frequency and time).

A method of excluding resources reserved through SPS or by other UEs may conform to the resource exclusion procedure of 3GPP TS 36.213. Alternatively, resources indicated to be used later through a decoded control signal may be excluded. A condition needed to exclude resources may be configured by the network for the UE through a physical layer signal or a higher layer signal.

As a first method, the UE may randomly select transmission resources from among M candidate resources. When retransmission of a specific MAC protocol data unit (PDU) is performed multiple times, the UE may randomly select a plurality of indexes in different times. Alternatively, the UE randomly selects the transmission resources from among resources having measured energy (e.g., a sidelink RSSI (S-RSSI) defined in TS 36.214) less than a predetermined threshold among the M candidate resources. The UE may select the transmission resources from among resources having absolute values of the S-RSSI less than a predetermined threshold or determine relative rankings of resources and randomly select the transmission resources from among resources having rankings lower than a predetermined ranking. In an actual operation of the UE, the UE compares a received strength of a candidate resource of a past timing with a received strength of a candidate resource of a future timing. Since it is impossible to select and transmit a resource of a past timing, the UE may perform an operation by estimating received strengths of candidate resources included in slots from n+a to n+k based on a measurement value of the received strength of the candidate resource of the past timing. As an example, an average value of received strengths measured at a predetermined period on the same frequency resource may be regarded as an estimate value on the corresponding frequency resource.

As a second method, the UE may randomly select a BC in a predetermined range when resource reselection is triggered, measure the energy of each candidate resource starting from slot n+a, decrease the BC by one when the energy is observed as being less than a predetermined threshold, and perform transmission on a corresponding candidate resource when the BC reaches 0.

The range for selecting the BC may be determined as a function of M, which is the number of candidate resources (or candidate subchannels) in a resource pool and may be determined according to priority of a packet or latency requirement and reliability demanded for the packet.

For example, the UE may select the BC in the range of a*M according to an attribute of the packet and measure energy or an S-RSSI in a descending index order of candidate resources. If the measured value is less than a predetermined threshold, the UE may decrease the BC by one. The UE may perform transmission in the next TTI/slot/subframe when the remaining BC is less than or equal to the number of candidate resources in a TTI/slot/subframe or when it is expected that the BC will expire in a TTI/slot/subframe.

Alternatively, the UE may select BC in the range of a*M based on priority of the packet or reliability or latency requirement demanded for the packet. When priority of the packet is high (or when reliability demanded for the packer is high or latency requirement is strict), the value of a may be set to a small value. Alternatively, as priority is low (or as demanded reliability is low or latency requirement is loose), the value of a may be set to a large value. The range of the BC or the value of a, used according to priority of the packet (or demanded reliability or latency requirement), may be preset or may be signaled through a physical layer or higher layer signal by the network.

When decreasing the BC by measuring the S-RSSI, the UE may decrease the BC based not only on an absolute value of the S-RSSI but also on a relative value of the S-RSSI measured within a predetermined time. For example, the UE that has measured the S-RSSI during a predetermined time may determine relative rankings of S-RSSIs. The UE may determine a threshold value of S-RSSIs lower than a predetermined ranking and determine whether to decrease the BC based on the measured threshold value. This method may be used to evaluate a relatively good resource, rather than an absolutely good resource.

The proposed scheme enables faster transmission according to priority while possibly satisfying a latency requirement. The existing CSMA scheme exponentially increases a BC window upon occurrence of collision so that collision is avoided. According to the proposed scheme, since limitations satisfying the latency requirement are first configured and the BC is determined in consideration of the number of candidate resources, the BC suitable for latency requirement may be determined. Even when the range for selecting the BC is differently determined according to priority, since the BC is selected in consideration of the number of candidate resources in a range satisfying the latency requirement, a packet having a higher priority is protected and the latency requirement is satisfied.

Figure 15:
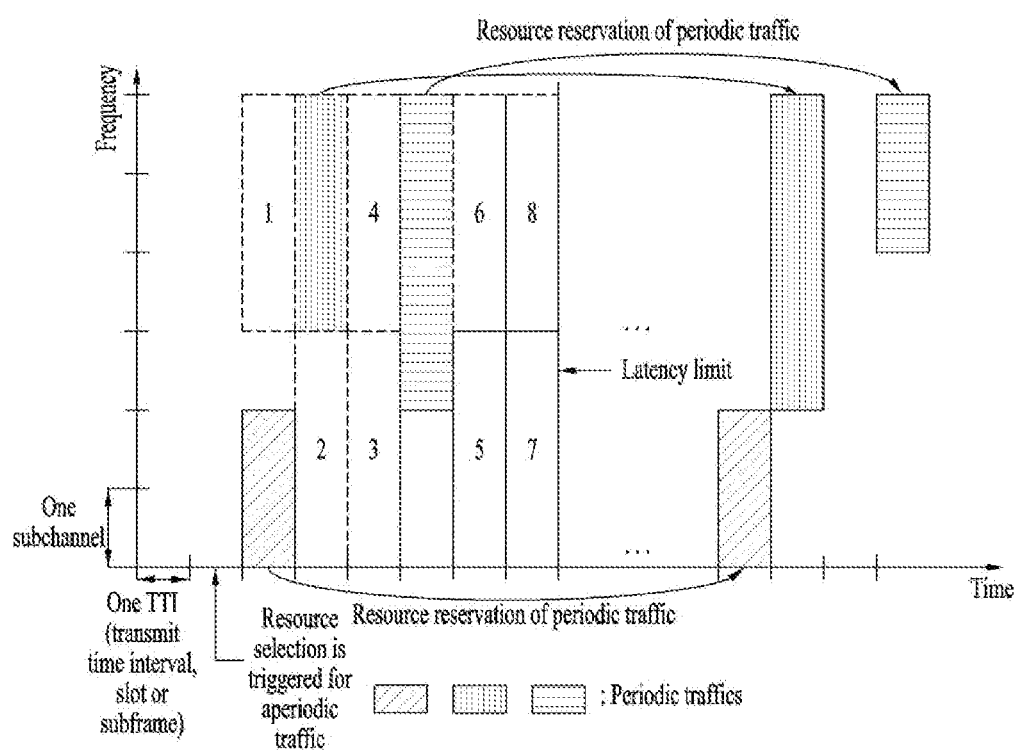
FIG. 15 illustrates a resource selection method when the UE has an aperiodic packet.

FIG. 15 illustrates a resource selection method when the UE has an aperiodic packet.

According to the above first method, resources may be randomly selected from among 7 resources or from among resources having low RSSIs. According to the above second method, the BC is selected according to priority and an RSSI is measured. The BC is decreased whenever the RSSI is less than a predetermined threshold and resources are selected from among resources in a slot in which it is expected that the BC will expire and then are transmitted. For example, it is assumed that M=7 and a=0.4 with respect to a packet having a high priority. If a natural number, 2, which is smaller than 2.8, is selected, when RSSIs of candidate resources 1 and 2 are less than the threshold, the BC is decreased by one and candidate resources 3 and 4 are selected.

A method of splitting a (time or frequency) resource region according to a media access scheme. The network may indicate or predetermine which access scheme a specific resource pool uses through a physical layer signal or a higher layer signal. In this scheme, the resource region is semi-statically split based on two different radio access schemes and the UE selectively uses the resource region according to a type of a packet transmitted thereby or an attribute of the packet. For example, upon transmitting a cooperative awareness message (CAM), a specific UE may use a resource region configured as SPS and, upon transmitting an event-triggered message or a message with a tight latency requirement, the UE may opportunistically select an LBT-based resource region.

More specifically, an available attribute may be configured in each resource pool. In other words, an available resource pool based on LBT is distinguished from an available resource pool based on sensing with semi-persistent transmission. According to an attribute of a packet, any one of the available resource pool based on LBT and the available resource pool based on sensing with semi-persistent transmission may be preconfigured to be selected. For example, a specific resource pool may be preconfigured to be used when a latency requirement is less than a predetermined threshold, a message should be urgently transmitted, a message size variation is equal to or greater (or less) than a predetermined threshold, a message size is equal to or greater (or less) than a predetermined threshold, an MCS level is equal to or greater (or less) than a predetermined threshold, priority of a packet is lower (or equal to or higher) than a predetermined threshold, reliability demanded for a packet is equal to or higher (or lower) than a predetermined threshold, a packet is generated through a specific application, or a packet is for a specific service. For example, the UE that transmits a packet having the above-described attribute is permitted to use a resource pool configured to select an LBT-based resource and, in the other cases, the UE may be determined to use a resource pool configured to be transmitted through sensing with semi-persistent transmission.

In an operation of splitting a resource pool according to each access scheme, an attribute of an available packet in each resource pool may be predetermined or may be signaled by the network through a physical layer signal or a higher layer signal.

Thus, when the resource pool is semi-statically split according to a radio resource selection scheme, a periodic packet contends only with a periodic packet and an aperiodic packet contends only with an aperiodic packet, so that reliability according to an attribute of each packet may be easily achieved.

Alternatively, only a specific access scheme may be permitted in a specific resource pool and a plurality of access schemes may be permitted in other resource pools. For example, both a sensing scheme with semi-persistent transmission and a resource selection scheme for LBT-based or aperiodic packet transmission may be permitted in resource pool A and only a resource selection scheme for LBT-based or aperiodic packet transmission may be permitted in resource pool B. In this case, when there is a fewer number of UEs using a specific resource region, another access scheme may opportunistically coexist, so that efficiency may be increased.

Meanwhile, the contents of the present disclosure are not limited only to D2D communication and may be used on UL or DL. In this case, an eNB or a relay node may use the proposed methods. Since examples of the above-described proposed methods may be included in one of implementation methods of the present disclosure, it is obvious that the examples may be regarded as proposed methods. Although the above-described proposed methods may be independently implemented, the proposed methods may be implemented in a combined (or incorporated) form of parts of the proposed methods. A rule may be defined such that information as to whether the proposed methods are applied (or information about rules of the proposed methods) is indicated by an eNB to a UE or by a transmission UE to a reception UE through a predefined signal (e.g., a physical layer signal or a higher-layer signal).

Figure 16:
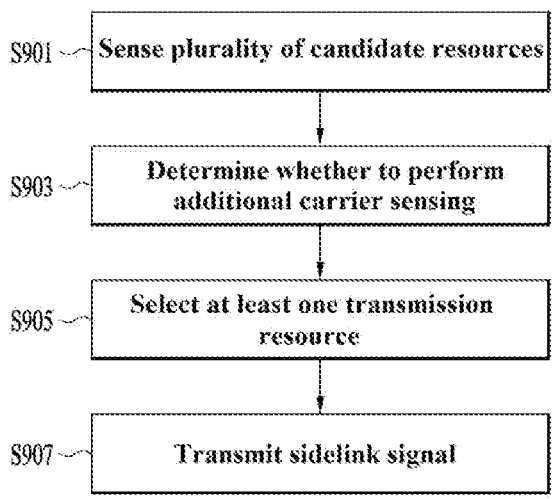
FIG. 16 is a diagram illustrating a method of transmitting a sidelink signal according to an embodiment.

FIG. 16 is a diagram illustrating a method of transmitting a sidelink signal according to an embodiment.

Referring to FIG. 16, the UE may sense a plurality of candidate resources in a predetermined resource pool. Specifically, the UE may receive a sidelink signal related to the predetermined resource pool and acquire information about reserved resources to be occupied by other UEs based on control information included in the received sidelink signal. The UE may sense, as the candidate resources, the remaining resources except for resources related to the reserved resources among resources included in the predetermined resource pool. (S901).

The plural candidate resources may correspond to plural subchannels. In other words, the resource pool may be divided into a plurality of subchannels. The UE may acquire information about subchannels reserved by other UEs among the plural subchannels and sense or determine subchannels except for the reserved subchannels among the plural subchannels as plural candidate subchannels which correspond to the plural candidate resources.

Next, the UE may select a transmission resource for transmitting the sidelink signal from among the plural sensed candidate resources. The UE may determine whether to perform additional carrier sensing prior to selection of the transmission resource from among the plural candidate resources (S903). The UE may determine whether to perform additional carrier sensing prior to selection of the transmission resource based on an attribute of the sidelink signal or an attribute of a packet included in the sidelink signal. That is, if it is determined that there is a low possibility of collision with signals of other UEs through carrier sensing during a predetermined timing (or until the predetermined timing) after determining the plural candidate resources, the UE may select the transmission resource from among the plural candidate resources. Unlike this case, if it is determined not to perform additional carrier sensing, the UE may randomly select the transmission resource from among the plural candidate resources without latency caused by additional carrier sensing (S905).

Specifically, the UE may determine whether to perform additional carrier sensing in consideration of a latency requirement of the sidelink signal or the packet and a preset threshold time. The UE may compare a timing at which transmission latency of the packet or the sidelink signal is permitted according to the latency requirement with a preset threshold timing. The UE may determine to perform additional carrier sensing when the remaining time up to the timing at which the transmission latency is permitted is equal to or greater than the preset threshold timing. In this case, if it is determined, based on additional carrier sensing, that there is a low probability of collision with sidelink signals of other UEs on the plural candidate resources, the UE may select the transmission resource for transmission of the sidelink signal from among the remaining candidate resources after additional carrier sensing is performed among the plural candidate resources.

When the UE performs additional carrier sensing, the UE may perform carrier sensing upon the plural candidate resources and check whether the plural candidate resources are occupied by other UEs. The UE may perform carrier sensing until a predetermined timing. The predetermined timing may be determined based on a BC having a preset count value or may be determined based on a latency requirement among attributes of the packet or the sidelink signal.

The predetermined timing may be determined based on the BC having the preset count value. The UE backs off the BC upon sensing a resource on which a signal with a received strength less than a preset threshold is received among the plural candidate resources. If the BC expires, the UE may sequentially or randomly select the transmission resource from among resources after expiration of the BC among the plural candidate resources. The preset threshold may be configured based on received signal strengths measured on the plural candidate resources during a preset time. For example, the UE may determine relative rankings with respect to the signal strengths measured during the preset time and set a signal strength for a few lower percent among the determined rankings as the preset threshold. Unlike this case, if the number of the remaining candidate resources among the plural candidate resources is less than the number of transmission resources for transmission of the sidelink signal before the BC expires, the UE does not transmit the sidelink signal on the plural candidate resources and may select a transmission resource for transmission of the sidelink signal from among a plurality of candidate resources determined again later.

The UE may differently set a range in which the count value configured in the BC is selected according to an attribute of the packet. For example, the UE may set the range in which the count value is selected by multiplying an upper limit value M of a specific count value by a specific weight. The specific weight (<1) may be determined according to the attribute of the packet. For example, if priority of a specific packet is higher than priority of another packet, a weight for the specific packet may be set to be a smaller value than a weight for the other packet. Alternatively, if a latency requirement of the specific packet is stricter than a latency requirement of the other packet, the weight for the specific packet may be set to a smaller value than the weight for the other packet. If reliability of the specific packet is higher than reliability of the other packet, the weight for the specific packet may be set to a smaller value than the weight for the other packet.

The predetermined timing may be determined according to the latency requirement of the packet or the sidelink signal. Specifically, the timing at which the transmission latency of the packet or the sidelink signal is permitted may be determined according to the latency requirement of the packet or the sidelink signal. The UE may determine the predetermined timing as a timing preceded by a preset specific timing from the timing at which the latency is permitted after the plural candidate resources are determined. For example, if the latency is permitted up to 30 ms from a current time (or from a timing at which the plural candidate resources are determined) and the preset specific timing is 10 ms, the predetermined timing may be determined as 20 ms from the current time.

In this case, the UE may determine whether a signal with a received strength equal to or greater than a preset threshold is received until the predetermined timing with respect to the plural candidate resources. Specifically, if the number of times by which a signal with a received strength equal to or greater than the preset threshold is sensed is less than a preset number of times, the UE may select the transmission resource from among candidate resources after the predetermined timing among the plural candidate resources and transmit the sidelink signal. Unlike this case, if the number of times by which a signal with a received strength equal to or greater than the preset threshold is sensed is equal to or greater than the preset number of times, the UE may not transmit the sidelink signal on the plural candidate resources. The preset number of times may be preset to a positive integer value or may be determined according to the status of a channel or the latency requirement of the sidelink signal or the packet.

The predetermined timing may be set to a real value or an integer value larger than 0. For example, the predetermined timing may be preset to 20 ms. In this case, the UE may perform carrier sensing upon the plural candidate resources for 20 ms from a current time (or a timing at which the plural candidate resources are determined).

The UE may determine whether to perform additional carrier sensing based on an attribute of the sidelink signal or an attribute of a packet included in the sidelink signal. The attribute of the sidelink signal is at least one of a level of an MCS, the size of a message included in the sidelink signal, a variation degree of the size of the message, or a latency requirement of the message. The attribute of the packet may be preset or predetermined as at least one of periodicity of the packet, priority of the packet, or a latency requirement and reliability demanded for the packet.

If periodic transmission of the packet is not demanded, the UE may determine that carrier sensing is performed prior to selection of the transmission resource for transmission of the sidelink signal. If periodic transmission of the packet is demanded, the UE may randomly select the transmission resource from among the plural candidate resources.

When priority of the packet is equal to or higher than a preset threshold, the UE may determine that carrier sensing is performed prior to selection of the transmission resource for transmitting the sidelink signal. When priority of the packet is lower than the preset threshold, the UE may randomly select the transmission resource from among the plural candidate resources without performing additional carrier sensing. When the latency requirement for the packet is less than a preset latency time, the UE may determine that carrier sensing is performed prior to selection of the transmission resource for transmitting the sidelink signal. When the latency requirement of the packet is equal to or greater than the preset latency time, the UE may randomly select the transmission resource from among the plural candidate resources without performing additional carrier sensing.

The UE may determine a specific resource pool as the predetermined resource pool among a plurality of resource pools based on the attribute of the packet or the attribute of the sidelink signal. The plural resource pools may include a first resource pool requiring additional carrier sensing and a second resource pool not requiring additional carrier sensing. The plural resource pools may further include a third resource pool configured regardless of performing additional carrier sensing. In this case, the UE may determine any one of the first resource pool to the third resource pool as the predetermined resource pool according to the attribute of the packet or the attribute of the sidelink signal. For example, if priority of the packet is higher than a specific threshold priority, the UE may configure or determine the first resource pool as the predetermined resource pool and, if priority of the packet is equal to or lower than the specific threshold priority, the UE may configure the second resource pool as the predetermined resource pool.

In this case, upon determining the plural candidate resources in the first resource pool based on the attribute of the sidelink signal or the attribute of the packet, the UE may select the transmission resource from among the plural candidate resources after performing additional carrier sensing for the plural candidate resources. Upon determining the plural candidate resources in the second resource pool, the UE may randomly select the transmission resource from among the plural candidate resources without performing additional carrier sensing for the plural candidate resources. Upon determining the plural candidate resources in the third resource pool, the UE may determine whether to perform additional carrier sensing based on the attribute of the packet or the attribute of the sidelink signal.

Next, the UE may select the transmission resource according to the determined resource selection type and transmit the sidelink signal on the selected transmission resource (S907).

Figure 17:
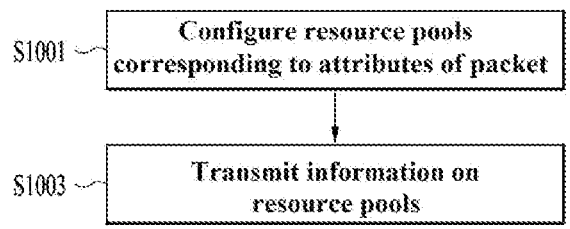
FIG. 17 is a diagram illustrating a method of configuring a resource pool by an eNB according to an embodiment.

FIG. 17 is a diagram illustrating a method of configuring a resource pool by an eNB according to an embodiment.

Referring to FIG. 17, the eNB may preconfigure the plural resource pools corresponding respectively to attributes of a packet to be transmitted by the UE or attributes of a sidelink signal to be transmitted by the UE. That is, the eNB may preconfigure resource pools corresponding to a level of an MCS, the size of a message included in the sidelink signal, a variation degree of the size of the message, or a latency requirement of the message. Alternatively, the eNB may preconfigure resource pools corresponding to periodicity of the packet, priority of the packet, or a latency requirement and reliability demanded for the packet (S1001).

Next, the eNB may transmit configuration information about the plural resource pools corresponding respectively to the attributes of the sidelink signal or the attributes of the packet to the UE. As described with reference to FIG. 16, the resource pools may include a first resource pool requiring additional carrier sensing, the second resource pool for randomly selecting the transmission resource without performing additional carrier sensing, and the third resource pool irrelevant to whether additional carrier sensing is performed (S1003).

Figure 18:
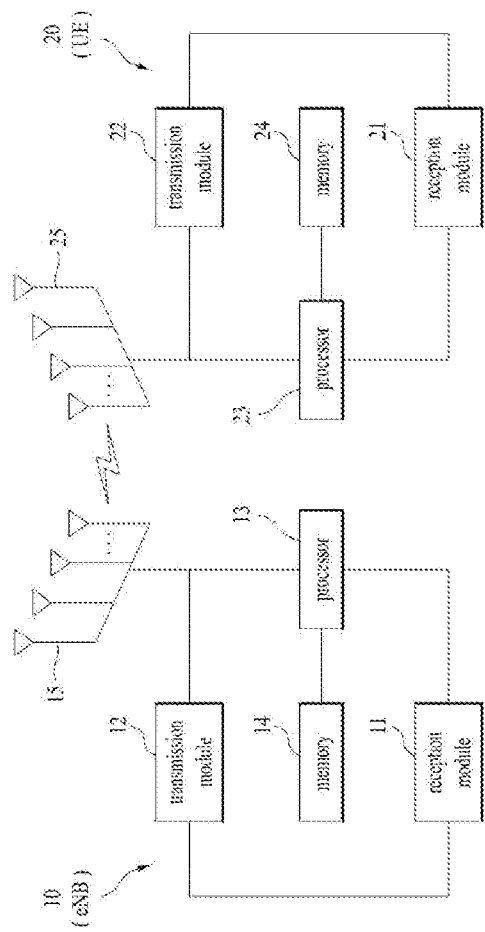
FIG. 18 is a block diagram of wireless communication devices according to an embodiment of the present disclosure.

FIG. 18 is a diagram schematically illustrating a UE and an eNB, for performing D2D communication.

Referring to FIG. 18, a UE 20 according to the present disclosure may include a reception module 21, a transmission module 22, a processor 23, a memory 24, and a plurality of antennas 25. Use of the plural antennas 25 means that the UE supports MIMO transmission and reception. The reception module 21 may receive various signals, data, and information on DL from the eNB. The transmission module 22 may transmit various signals, data, and information on UL to the eNB. The processor 23 may control overall operation of the UE 20.

The processor 23 of the UE 20 according to an embodiment of the present disclosure may process operations required for the above-described embodiments.

Specifically, the processor 23 may sense a plurality of candidate resources from a predetermined resource pool. The processor 23 may determine the plural candidate resources based on reserved resources sensed from a predetermined resource pool and a received strength of a received signal, determine whether to perform additional carrier sensing for selecting a transmission resource from among the plural candidate resources, based on an attribute of the sidelink signal or an attribute of a packet included in the sidelink signal, select the transmission resource after performing carrier sensing for the plural candidate resources until a predetermined timing, when carrier sensing is performed, and transmit the sidelink signal on the selected transmission resource.

The processor 23 of the UE 20 processes information received by the UE 20 and information to be transmitted to the outside of the UE 20. The memory 24 may store the processed information for a predetermined time and may be replaced with a component such as a buffer (not shown).

Referring to FIG. 18 again, the eNB 10 according to the present disclosure may include a reception module 11, a transmission module 12, a processor 13, a memory 14, and a plurality of antennas 15. Use of the plural antennas 15 means that the eNB supports MIMO transmission and reception. The reception module 11 may receive various signals, data, and information on UL from the UE. The transmission module 12 may transmit various signals, data, and information on DL to the UE. The processor 13 may control overall operation of the eNB 10.

The processor 13 of the eNB 10 according to an embodiment of the present disclosure may process operations required for the above-described embodiments. Specifically, the processor 13 may preconfigure the plural resource pools corresponding respectively to attributes of a packet to be transmitted by the UE or attributes of a sidelink signal to be transmitted by the UE. The processor 13 may preconfigure resource pools corresponding to a level of an MCS, the size of a message included in the sidelink signal, a variation degree of the size of the message, or a latency requirement of the message. Alternatively, the processor 13 may preconfigure resource pools corresponding to periodicity of the packet, priority of the packet, or a latency requirement and reliability demanded for the packet. The processor 13 may control the transmission module 12 to transmit configuration information about the plural resource pools corresponding respectively to the attributes of the sidelink signal or the attributes of the packet to the UE.

Figure 19:
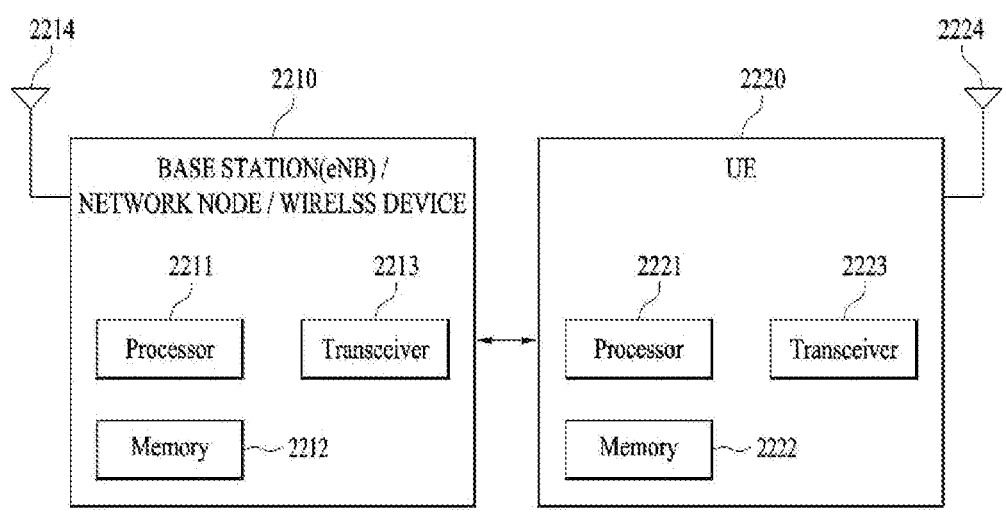
FIG. 19 is a block diagram of wireless communication devices according to an embodiment of the present disclosure.

FIG. 19 is a block diagram of wireless communication devices according to an embodiment of the present disclosure.

Referring to FIG. 19, a wireless communication system may include a BS (eNB) 2210 and a UE 2220. The UE 2220 may be located in the coverage of the BS 2210. In some embodiments, the wireless communication system may include a plurality of UEs. Although FIG. 19 shows the BS 2210 and the UE 2220, the present disclosure is not limited thereto. For example, the BS 2210 may be replaced with a network node, a UE, a radio device, etc. Alternatively, each of the BS and UE may be substitute with a radio communication device or a radio device.

The BS 2210 may include at least one processor 2211, at least one memory 2212, and at least one transceiver 2213. The processor 2211 may be configured to process the details of the embodiments to implement the functions, procedures, or methods described above in the embodiments.

In addition, the processor 2211 may implement at least one protocols. For example, the processor 2211 may implement one or more radio interface protocol layers (e.g., functions layers). The memory 2212 may be connected to the processor 2211 and store various types of information and/or instructions. The transceiver 2213 may be electrically connected to the processor 2211 and transmit and receive radio signals under the control of the processor 2211.

The UE 2220 may include at least one processor 2221, at least one memory 2222, and at least one transceiver 2223. The processor 2221 may perform the operations required for the embodiments to implement the functions, procedures or methods described above in the embodiments.

In addition, the processor 2221 may implement one or more protocols. For example, the processor 2221 may implement one or more radio interface protocol layers (e.g., functional layers). The memory 2222 may be connected to the processor 2221 and configured to store various types of information and/or instructions. The transceiver 2223 may be electrically connected to the processor 2221 and configured to transmit and receive radio signals under the control of the processor 2221.

The memory 2212 and/or 2222 may be located inside or outside the processor 2211 and/or 2221 and connected to the processor 2211 and/or 2221 in various ways such as wireless or wired connections.

Each of the BS 2210 and/or the UE 2220 may have a single antenna or multiple antennas. For example, an antenna 2214 and/or 2224 may be configured to transmit and receive radio signals.

Figure 20:
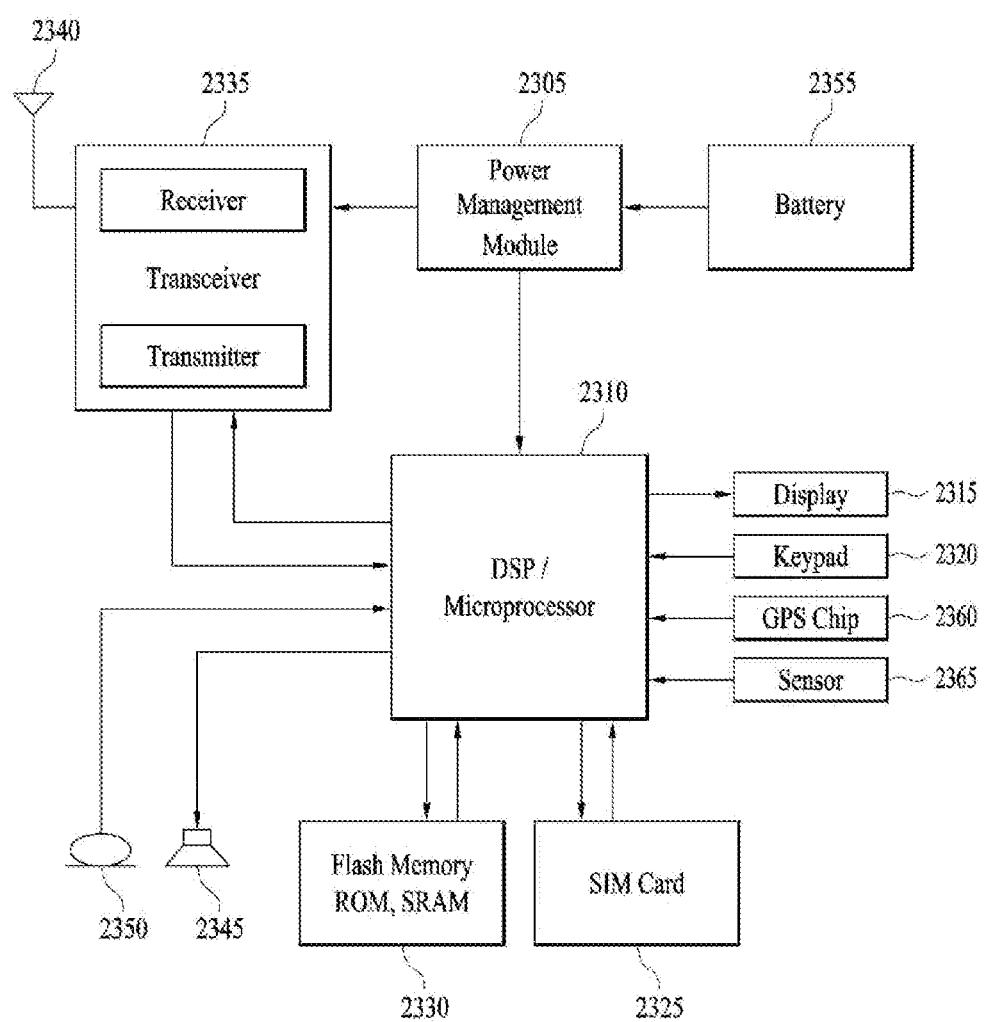
FIG. 20 is a diagram schematically illustrating a wireless communication device according to an embodiment of the present disclosure.

FIG. 20 is a diagram schematically illustrating a wireless communication device according to an embodiment of the present disclosure.

Particularly, FIG. 20 illustrates, as an example, the UE 2220 shown in FIG. 19 in detail. However, the wireless communication device of FIG. 20 is not limited to the UE 2220, and the wireless communication device may be any mobile computing device configured to be suitable for implementing at least one of the above-described embodiments. For example, such a mobile computing device may include a vehicle communication system and/or device, a wearable device, a laptop, a smartphone, etc.

Referring to FIG. 20, the UE 2220 may include at least one of the following components: a processor 2310 including a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, a memory 2330, a subscriber identification module (SIM) card 2325, a speaker 2345, and a microphone 2350. The UE 2220 may include a single antenna or multiple antennas.

The processor 2310 may be configured to process the details of the embodiments to implement the functions, procedures, or methods described above in the embodiments. In some embodiments, the processor 2310 may implement one or more protocols such as radio interface protocol layers (e.g., functional layers).

The memory 2330 may be connected to the processor 2310 and configured to store information related to operations of the processor 2310. The memory 2330 may be located inside or outside the processor 2310 and connected to the processor 2310 in various ways such as wireless or wired connections.

A user may enter various types of information (e.g., instruction information such as a phone number) in various ways, for example, by pushing the buttons on the keypad 2320 or by voice recognition through the microphone 2350. The processor 2310 may receive and process the information from the user and then perform an appropriate function such as dialing the phone number. In some embodiments, data (e.g., operational data) may be retrieved from the SIM card 2325 or the memory 2330 to perform specific function(s). In some embodiments, the processor 2310 may receive and process GPS information from the GPS chip 2360 and then perform functions related to the position or location of the UE (e.g., vehicle navigation, map services, etc.). In some embodiments, the processor 2310 may display various types of information and data on the display 2315 for the user's reference and convenience.

The transceiver 2335 may be connected to the processor 2310 and configured to transmit and/or receive a radio signal such as a radio frequency (RF) signal. The processor 2310 may control the transceiver 2335 to initiate communication and transmit radio signals including various types of information or data, for example, voice communication data. The transceiver 2335 includes a receiver configured to receive a radio signal and a transmitter configured to transmit a radio signal. The antenna 2340 is a device for performing radio signal transmission and reception. In some embodiments, upon receiving radio signals, the transceiver 2335 may forward and convert the signals to baseband frequency for processing by the processor 2310. The processed signals may be converted into audible or readable information based on various techniques, and the audible or readable information may be output through the speaker 2345 or the display 2315.

In some embodiments, the sensor 2365 may be connected to the processor 2310. The sensor 2365 may include one or more sensing devices configured to detect various types of information such as a speed, acceleration, light, vibration, proximity, location, image, etc. The processor 2310 may receive and process sensor information obtained from the sensor 2365 and perform various types of functions such as collision avoidance, autonomous driving, etc.

As shown in FIG. 20, the UE may further include various components (e.g., a camera, a universal serial bus (USB) port, etc.). For example, a camera may be further connected to the processor 2310 and used for various services such as autonomous driving, vehicle safety services, etc. That is, FIG. 20 shows one example of the UE, and thus, the scope of the present disclosure is not limited to the configuration illustrated in FIG. 20. For example, some of the following components: the keypad 2320, the GPS chip 2360, the sensor 2365, the speaker 2345, and the microphone 2350 may not be included or implemented in the UE.

Figure 21:
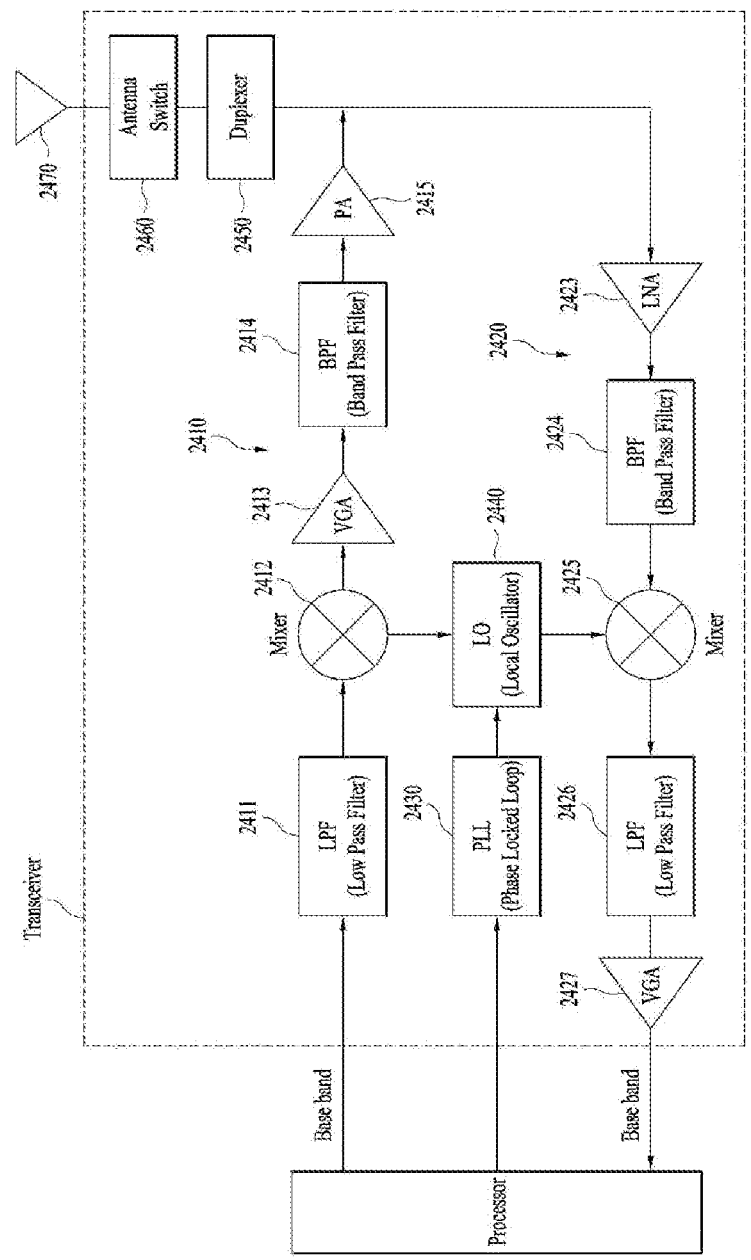
FIG. 21 is a block diagram schematically illustrating a transceiver of a wireless communication device.

FIG. 21 is a block diagram schematically illustrating a transceiver of a wireless communication device according to an embodiment of the present disclosure.

Specifically, FIG. 21 shows an example of a transceiver capable of operating in an FDD system.

Figure 22:
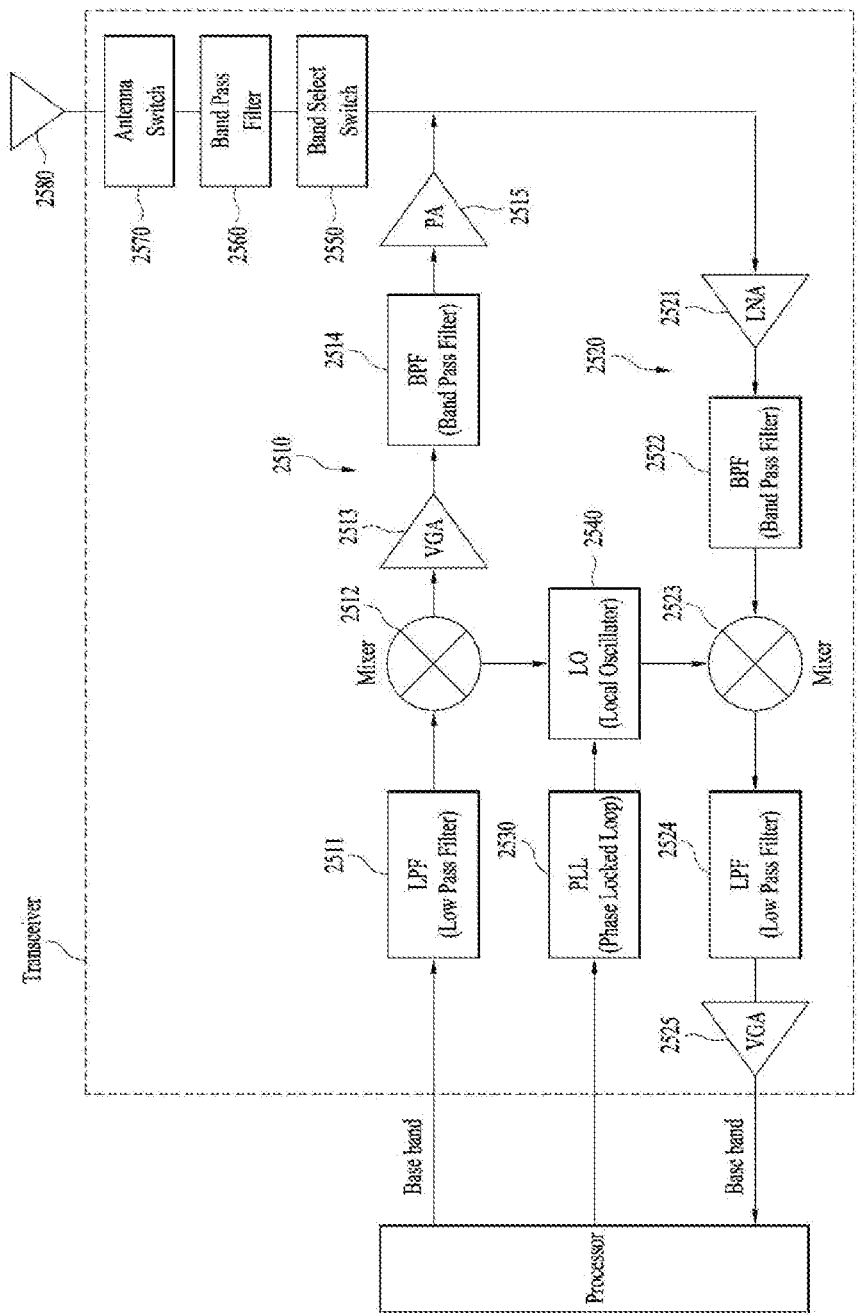
FIG. 22 is a block diagram schematically illustrating another example of a transceiver of a wireless communication device.

In the transmit path, at least one processor including the processors described in FIGS. 21 and 22 may be configured to process data to be transmitted and provide a signal such as an analog output signal to a transmitter 2410.

At the transmitter 2410, the analog output signal may be filtered by a low pass filter (LPF) 2411 (to remove artifacts caused by conventional analog-to-digital conversion (ADC)), up-converted from baseband to RF by an up-converter (e.g., mixer) 2412, and amplified a variable gain amplifier (VGA) 2413. The amplified signal may be filtered by a filter 2414, further amplified by a power amplifier (PA) 2415, routed through a duplexer 2450 and/or an antenna switch 2460, and transmitted on an antenna 2470.

In the receive path, the antenna 2470 may receive a signal from a wireless environment. The receive signal may be routed through the antenna switch 2460 and the duplexer 2450 and then provided to a receiver 2420.

At the receiver 2420, the received signal may be amplified by an amplifier such as a low noise amplifier (LNA) 2423, filtered by a band pass filter 2424, and down-converted from RF to baseband by a downconverter (e.g., mixer) 2425.

The down-converted signal may be filtered by an LPF 2426 and amplified by an amplifier such as a VGA 2427 to obtain an analog input signal. Then, the analog input signal may be provided to the processors in FIGS. 21 and 22.

Further, a local oscillator (LO) generator 2440 may generate and provide transmission and reception LO signals to the up-converter 2412 and the down-converter 2425, respectively.

The present disclosure is not limited to the configuration shown in FIG. 21, and various components and circuits may be arranged differently from the example shown in FIG. 21 to achieve the functions and effects according to the present disclosure.

FIG. 22 illustrates another example of a transceiver of a wireless communication device according to an embodiment of the present disclosure.

Specifically, FIG. 21 shows an example of a transceiver capable of operating in a TDD system.

In some embodiments, a transmitter 2510 and a receiver 2520 included in the transceiver of the TDD system may have one or more features similar to those of the transmitter and the receiver included in the transceiver of the FDD system. Hereinafter, the structure of the transceiver of the TDD system will be described.

In the transmit path, a signal amplified by a power amplifier (PA) 2515 in the transmitter is routed through a band select switch 2550, a BPF 2560, and an antenna switch 2570 and transmitted on an antenna 2580.

In the receive path, the antenna 2580 may receive a signal from a wireless environment. The receive signal may be routed through the antenna switch(es) 2570, BPF 2560, and band select switch 2550 and provided to the receiver 2520.

Figure 23:
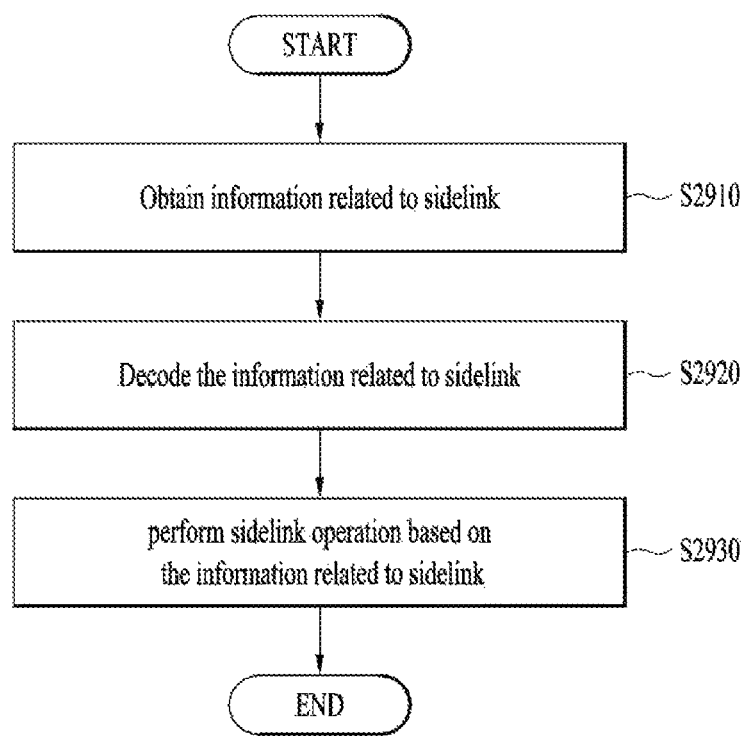
FIG. 23 is a flowchart for explaining sidelink operations of a wireless device.

FIG. 23 is a flowchart for explaining sidelink operations of a wireless device.

Referring to FIG. 23, the wireless device may obtain information related to sidelink (S2910). The information related to the sidelink may include at least one resource configuration. The information related to the sidelink may be obtained from another wireless device or a network node.

After obtaining the information, the wireless device may decode the information related to the sidelink (S2920).

After decoding the information related to the sidelink, the wireless device may perform one or more sidelink operations based on the information related to the sidelink (S2930). Herein, the sidelink operation(s) performed by the wireless device may correspond to the one or more operations described in the flowchart.

The sidelink operations of the wireless device illustrated in FIG. 23 is merely exemplary, and the wireless device may perform sidelink operations based on various techniques. The sidelink may correspond to a UE-to-UE interface for sidelink communication and/or sidelink discovery. The sidelink may correspond to a PC5 interface as well. In a broad sense, sidelink operation may mean information transmission/reception between UEs.

Figure 24:
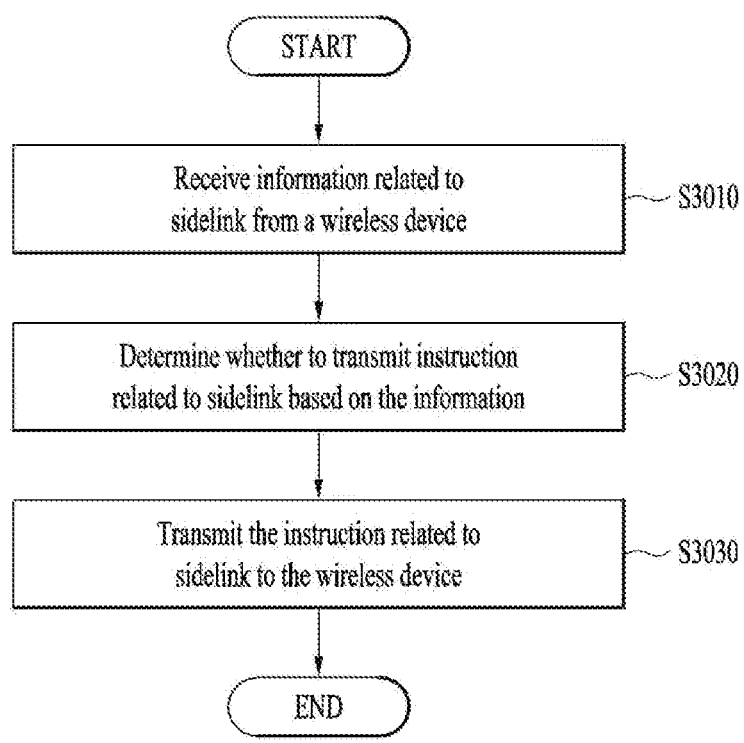
FIG. 24 is a flowchart for explaining sidelink operations of a network node.

FIG. 24 is a flowchart for explaining sidelink operations of a network node.

The sidelink operations of the network node illustrated in FIG. 24 is merely exemplary, and the network node may perform sidelink operations based on various techniques.

The network node may receive information related to sidelink from a wireless device (S3010). For example, the information related to the sidelink may be 'SidelinkUEInformation' which is used to indicate sidelink information to a network node.

After receiving the information, the network node may determine whether to transmit one or more instructions related to the sidelink based on the received information (S3020).

When determining to transmit the instruction(s), the network node may transmit the sidelink-related instruction(s) to the wireless device (S3030). In some embodiments, after receiving the instruction(s) transmitted from the network node, the wireless device may perform one or more sidelink operations based on the received instruction(s).

Figure 25:
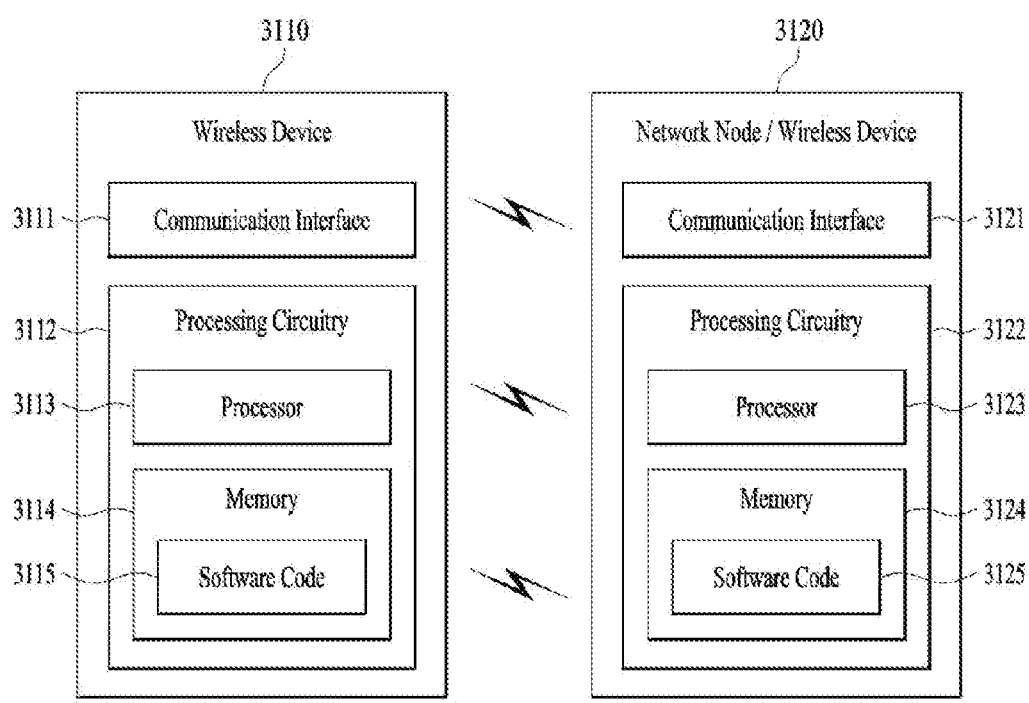
FIG. 25 is a block diagram schematically illustrating the configurations of a wireless device and a network node.

FIG. 25 is a block diagram schematically illustrating the configurations of a wireless device and a network node. A network node 3120 may be replaced with the wireless device or UE shown in FIG. 19.

For example, a wireless device 3110 may include a communication interface 3111 for communicating with one or more other wireless devices, network nodes, and/or other entities in the network. The communication interface 3111 may include one or more transmitters, one or more receivers, and/or one or more communications interfaces. The wireless device 3110 may include a processing circuitry 3112. The processing circuitry 3112 may include at least one processor such as a processor 3113 and at least one memory device such as a memory 3114.

The processing circuitry 3112 may be configured to control at least one of the above-described methods and/or processes and enable the wireless device 3110 to perform the methods and/or processes. The processor 3113 may correspond to one or more processors for performing the wireless device functions described herein. The wireless device 3110 may include a memory 3114 configured to store data, programmable software code, and/or other information described herein.

In some embodiments, the memory 3114 may be configured to store software code 3115 including instructions that allow at least one processor to perform some or all of the processes described above with reference to FIG. 23 or the methods described above in the embodiments.

For example, at least one process for transmitting and receiving information may be performed by the processor 3113 controlling the transceiver 2223 in FIG. 19 to transmit and receive the information.

The network node 3120 may include a communication interface 3121 for communicating with one or more other network nodes, wireless devices, and/or other entities in the network. The communication interface 3121 may include one or more transmitters, one or more receivers, and/or one or more communications interfaces. The network node 3120 may include a processing circuitry 3122. The processing circuitry 3122 may include a processor 3123 and a memory 3124.

For example, at least one process for transmitting and receiving information may be performed by the processor 3123 controlling the transceiver 2213 in FIG. 19 to transmit and receive the information.

The wireless device 3110 or the network node 3120 may be a BS, a network node, a Tx UE, an Rx UE, a wireless device, a wireless communication device, a vehicle, a vehicle having an autonomous traveling function, an unmanned aerial vehicle (UAV), an artificial intelligence (AI) module, a robot, an augmented reality (AR) device, a virtual reality (VR) device, an MTC device, an Internet of things (IoT) device, a medical device, a FinTech device (or a financial device), a security device, a weather/environment device, or a device related to fourth industrial revolution or a 5G service. The UAV may be, for example, an aircraft without a human being onboard, which aviates by a wireless control signal. The MTC device and the IoT device may be, for example, devices that do not require direct human intervention or manipulation and may include smartmeters, vending machines, thermometers, smartbulbs, door locks, or various sensors. The medical device may be, for example, a device used for the purpose of diagnosing, treating, relieving, curing, or preventing disease or a device used for the purpose of inspecting, replacing, or modifying a structure or a function and may include a device for treatment, a device for operation, a device for (in vitro) diagnosis, a hearing aid, or an operation device. The security device may be, for example, a device installed to prevent a danger that may arise and to maintain safety and may include a camera, a CCTV, or a black box. The FinTech device may be, for example, a device capable of providing a financial service such as mobile payment and may include a payment device or a point of sale (POS) system. The weather/environment device may be, for example, a device for monitoring or predicting a weather/environment.

The UE may include, for example, a cellular phone, a smartphone, a laptop computer, a digital broadcast terminal, a personal digital assistant (PDA), a portable multimedia player (PMP), a navigation system, a slate PC, a tablet PC, an ultrabook, a wearable device (e.g., a smartwatch, smartglasses, or a head mounted display (HMD)), or a foldable device. The HMD may be, for example, a type of display device that is worn on the head and may be used to implement VR or AR.

Figure 26:
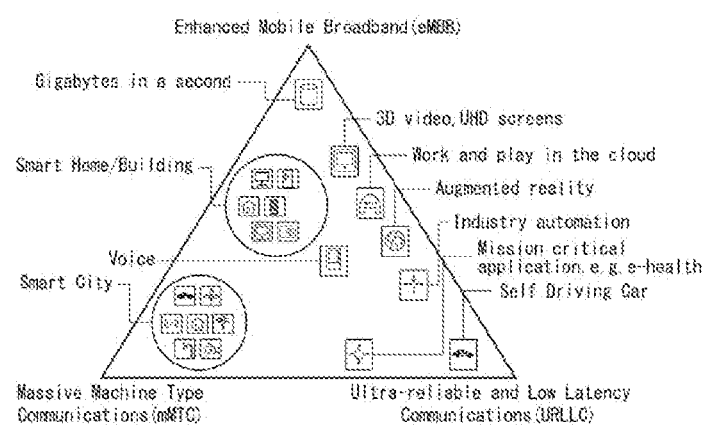
FIG. 26 is a diagram illustrating an example of 5G use scenarios.

Referring to FIG. 26, three main requirement categories for 5G include (1) a category of enhanced mobile broadband (eMBB), (2) a category of massive machine type communication (mMTC), and (3) a category of ultra-reliable and low-latency communications (URLLC).

Partial use cases may require a plurality of categories for optimization and other use cases may focus upon only one key performance indicator (KPI). 5G supports such various use cases using a flexible and reliable method.

eMBB far surpasses basic mobile Internet access and covers abundant bidirectional work and media and entertainment applications in cloud and augmented reality. Data is one of a core driving force of 5G and, in the 5G era, a dedicated voice service may not be provided for the first time. In 5G, it is expected that voice will simply be processed as an application program using data connection provided by a communication system. Main causes for increased traffic volume are increase in the size of content and an increase in the number of applications requiring high data transmission rate. A streaming service (of audio and video), conversational video, and mobile Internet access will be more widely used as more devices are connected to the Internet. These application programs require always-on connectivity in order to push real-time information and alerts to users. Cloud storage and applications are rapidly increasing in a mobile communication platform and may be applied to both work and entertainment. Cloud storage is a special use case which accelerates growth of uplink data transmission rate. 5G is also used for cloud-based remote work. When a tactile interface is used, 5G demands much lower end-to-end latency to maintain good user experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential IoT devices will reach 20.4 billion up to the year of 2020. Industrial IoT is one of categories of performing a main role enabling a smart city, asset tracking, smart utilities, agriculture, and security infrastructure through 5G.

URLLC includes new services that will transform industries with ultra-reliable/available, low-latency links such as remote control of critical infrastructure and a self-driving vehicle. A level of reliability and latency is essential to control and adjust a smart grid, industrial automation, robotics, and a drone.

Next, a plurality of use cases in a triangle of FIG. 26 will be described in more detail.

5G is a means of providing streaming at a few hundred megabits per second to gigabits per second and may complement fiber-to-the-home (FTTH) and cable-based broadband (or DOCSIS). Such high speed is needed to deliver TV at a resolution of 4K or more (6K, 8K, and more), as well as virtual reality and augmented reality. Virtual reality (VR) and augmented reality (AR) applications include immersive sports games. A specific application program may require a special network configuration. For example, for VR games, gaming companies need to incorporate a core server into an edge network server of a network operator in order to minimize latency.

Automotive is expected to be a new important driving force in 5G together with many use cases for mobile communication for vehicles. For example, entertainment for passengers requires high simultaneous capacity and mobile broadband with high mobility. This is because future users continue to expect high connection quality regardless of location and speed. Another automotive use case is an AR dashboard. The AR dashboard displays information talking to a driver about a distance to an object and movement of the object by being superimposed on an object seen from a front window to identify an object in the dark. In the future, a wireless module will enable communication between vehicles, information exchange between a vehicle and supporting infrastructure, and information exchange between a vehicle and other connected devices (e.g., devices transported by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by a human being.

A smart city and a smart home mentioned as a smart society will be embedded in a high-density wireless sensor network. A distributed network of an intelligent sensor will identify conditions for costs and energy-efficient maintenance of a city or a home. Similar configurations may be performed for respective households. All temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is highly decentralized so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of energy such as electricity by a method having efficiency, reliability, economic feasibility, sustainability of production, and automatability. The smart grid may also be regarded as another sensor network having low latency.

A health care part contains many application programs capable of enjoying the benefits of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in an industrial application field. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of cables and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

The above-described embodiments of the present disclosure may be implemented through various means, for example, hardware, firmware, software, or a combination thereof.

In a hardware configuration, the methods according to the embodiments of the present disclosure may be achieved by at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the methods according to the embodiments of the present disclosure may be implemented in the form of a module, a procedure, a function, etc. for performing the above-described functions or operations. Software code may be stored in a memory unit and executed by a processor. The memory unit may be located inside or outside the processor and exchange data with the processor via various known means.

The detailed descriptions of the preferred embodiments of the present disclosure are provided to allow those skilled in the art to implement and embody the present disclosure. While the present disclosure has been described and illustrated herein with reference to the preferred embodiments thereof, it will be apparent to those skilled in the art that various modifications and variations may be made therein without departing from the spirit and scope of the disclosure. Therefore, the present disclosure is not limited to the embodiments disclosed herein but intends to give the broadest scope consistent with the new principles and features disclosed herein.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present disclosure are applicable to various mobile communication systems.

What is claimed is:

1. A method of transmitting a sidelink signal by a user equipment (UE) in a wireless communication system supporting sidelink, the method comprising:
performing a synchronization for a sidelink communication;
receiving configuration information for configuring a resource pool including a plurality of sub-channels for sidelink communication;
determining a plurality of candidate resources based on reserved resources sensed from the resource pool and a received strength of a signal;
based on an attribute of a packet included in the sidelink signal, determining to perform additional carrier sensing for selecting a transmission resource from among the plural candidate resources;
based on performing the carrier sensing, selecting the transmission resource; and
transmitting the sidelink signal based on the selected transmission resource,
wherein the additional carrier sensing is performed based on a back-off counter that is backed off by a detection of a reception strength below a specific threshold for each of the plurality of sub-channels, and
wherein a counter value of the back-off counter is selected within a differently configured a counter range based on the attribute of the packet.

2. The method of claim 1,
wherein the attribute of the packet is at least one of periodicity of the packet, priority of the packet, or a latency requirement and reliability demanded for the packet.

3. The method of claim 2,
wherein whether to perform the carrier sensing is determined based on a result of comparing a preset threshold time with a time from a specific timing to a timing at which latency of transmission of the packet according to the latency requirement is permitted.

4. The method of claim 1,
wherein the resource pool is determined based on the attribute of the packet among a plurality of resource pools.

5. The method of claim 1,
wherein, based on non-demand for periodic transmission of the packet, the transmission resource is selected after the carrier sensing is performed until the predetermined timing based on the back-off counter.

6. The method of claim 1,
wherein, based on priority of the packet equal to or higher than a preset threshold, the transmission resource is selected after the carrier sensing is performed based on the back-off counter.

7. The method of claim 1,
wherein, based on a latency requirement for the packet less than a preset latency time, the transmission resource is selected after the carrier sensing is performed based on the back-off counter.

8. An apparatus for transmitting a sidelink signal in a wireless communication system supporting sidelink, the apparatus comprising:
a processor; and
a memory connected to the processor,
wherein the processor is configured to:
perform a synchronization for a sidelink communication;
receive configuration information for configuring a resource pool including a plurality of sub-channels for sidelink communication;
determine a plurality of candidate resources based on reserved resources sensed from the resource pool and a received strength of a signal,
based on an attribute of a packet included in the sidelink signal, determine to perform additional carrier sensing for selecting a transmission resource from among the plural candidate resources, based on performing the carrier sensing, select the transmission resource after performing the carrier sensing for the plural candidate resources until a predetermined timing, transmit the sidelink signal based on the selected transmission resource, wherein the additional carrier sensing is performed based on a back-off counter that is backed off by a detection of a reception strength below a specific threshold for each of the plurality of sub-channels, and wherein a counter value of the back-off counter is selected within a differently configured a counter range based on the attribute of the packet.

* * * * *